(12) United States Patent
Wright et al.

(10) Patent No.: US 7,820,728 B2
(45) Date of Patent: Oct. 26, 2010

(54) METHODS AND SYSTEMS FOR RECYCLING CARPET AND CARPETS MANUFACTURED FROM RECYCLED MATERIAL

(75) Inventors: Jeffrey Wright, Cartersville, GA (US); Kellie Ballew, Canton, GA (US)

(73) Assignee: Columbia Insurance Company, Omaha, NE (US)

( * ) Notice: Subject to any disclaimer, the term of this patent is extended or adjusted under 35 U.S.C. 154(b) by 124 days.

(21) Appl. No.: 11/939,496

(22) Filed: Nov. 13, 2007

(65) Prior Publication Data

US 2008/0113146 A1     May 15, 2008

Related U.S. Application Data

(60) Provisional application No. 60/865,611, filed on Nov. 13, 2006.

(51) Int. Cl.
 *C08J 11/04* (2006.01)
(52) U.S. Cl. .......................... 521/40.5; 521/40; 521/46; 521/47; 521/48; 521/48.5; 156/60; 156/72; 428/95; 428/339; 139/2; 139/391; 139/399; 139/420 R; 524/915; 528/480; 528/491; 528/495; 528/496; 528/497
(58) Field of Classification Search ................. 521/40, 521/40.5, 41.42, 42.5, 43.5, 44, 44.5, 46, 521/47, 48, 48.5, 49.5; 528/480, 491, 495, 528/496, 497; 428/85, 95, 339, 364, 373; 139/2, 391, 399, 420 R; 524/915; 156/60, 156/72

See application file for complete search history.

(56) References Cited

U.S. PATENT DOCUMENTS

| | | | |
|---|---|---|---|
| 3,390,035 A | 6/1968 | Sands | 156/72 |
| 3,551,231 A | 12/1970 | Smedberg | 156/72 |
| 3,583,936 A | 6/1971 | Stahl | 260/28.5 |
| 3,645,992 A | 2/1972 | Elston | 260/80.78 |
| 3,684,600 A | 8/1972 | Smedberg | 156/93 |
| 3,745,054 A | 7/1973 | Smedberg | 161/67 |
| 3,873,643 A | 3/1975 | Wu et al. | 260/878 |
| 3,882,194 A | 5/1975 | Krebaum et al. | 260/878 |
| 3,887,738 A | 6/1975 | Taft et al. | 428/95 |
| 3,914,489 A | 10/1975 | Smedberg | 428/97 |
| 3,975,562 A | 8/1976 | Madebach et al. | 428/95 |
| 3,982,051 A | 9/1976 | Taft et al. | 427/207 |
| 4,010,302 A | 3/1977 | Anderson et al. | 428/95 |
| 4,018,733 A | 4/1977 | Lopez et al. | 260/27 |
| 4,076,698 A | 2/1978 | Anderson et al. | 526/348.6 |
| 4,087,507 A | 5/1978 | Haas et al. | 264/211 |
| 4,115,125 A | 9/1978 | Etter et al. | 96/83 |
| 4,230,830 A | 10/1980 | Tanny et al. | 525/222 |
| 4,242,395 A | 12/1980 | Zuckerman et al. | 428/96 |
| 4,315,048 A | 2/1982 | Beghelli et al. | 428/78 |
| 4,379,190 A | 4/1983 | Schenck | 428/95 |
| 4,389,434 A | 6/1983 | Polman | 428/17 |
| 4,438,228 A | 3/1984 | Schenck | 524/109 |
| 4,460,745 A | 7/1984 | Adur et al. | 525/74 |
| 4,472,555 A | 9/1984 | Schmukler et al. | 525/74 |
| 4,582,554 A | 4/1986 | Bell et al. | 156/247 |
| 4,643,940 A | 2/1987 | Shaw et al. | 428/308.4 |
| 4,684,576 A | 8/1987 | Tabor et al. | 428/441 |
| 4,710,415 A | 12/1987 | Slosberg et al. | 428/48 |
| 4,737,221 A | 4/1988 | Bell et al. | 156/231 |
| 4,762,890 A | 8/1988 | Strait et al. | 525/257 |
| 4,798,081 A | 1/1989 | Hazlitt et al. | 73/53 |
| 4,798,644 A | 1/1989 | Scott et al. | 156/324 |
| 4,927,888 A | 5/1990 | Strait et al. | 525/285 |
| 4,937,299 A | 6/1990 | Ewen et al. | 526/119 |
| 4,942,074 A | 7/1990 | Bell et al. | 428/95 |
| 5,001,179 A | 3/1991 | Kauffman et al. | 524/275 |
| 5,008,204 A | 4/1991 | Stehling | 436/85 |
| 5,026,798 A | 6/1991 | Canich | 526/127 |
| 5,030,497 A | 7/1991 | Claessen | 428/95 |
| 5,055,438 A | 10/1991 | Canich | 502/117 |
| 5,064,802 A | 11/1991 | Stevens et al. | 502/155 |
| 5,107,430 A | 4/1992 | Magnino | 364/426.03 |
| 5,194,462 A | 3/1993 | Hirasaka et al. | 524/13 |
| 5,199,141 A | 4/1993 | Trask et al. | 28/115 |

(Continued)

FOREIGN PATENT DOCUMENTS

EP         416815 A2     3/1991

(Continued)

OTHER PUBLICATIONS

Machine translation of JP 2000-169621.*

(Continued)

*Primary Examiner*—Ling-Siu Choi
*Assistant Examiner*—Frances Tischler
(74) *Attorney, Agent, or Firm*—Ballard Spahr LLP

(57) ABSTRACT

The present invention pertains to carpet and methods of making and recycling carpet. In one aspect, the carpet includes: a primary backing which has a face and a back surface; a plurality of fibers attached to the primary backing and extending from the face of the primary backing and exposed at the back surface of the primary backing; an adhesive composition backing; and an optional secondary backing adjacent to the adhesive backing. The method of making carpet includes extrusion coating the adhesive composition onto the back surface of a primary backing to form the adhesive composition backing. The method of recycling carpet can recover one or more polymeric carpet components.

20 Claims, 6 Drawing Sheets

U.S. PATENT DOCUMENTS

| | | | |
|---|---|---|---|
| 5,203,881 A | 4/1993 | Wiand | 52/293 |
| 5,204,155 A | 4/1993 | Bell et al. | 428/95 |
| 5,218,071 A | 6/1993 | Tsutsui et al. | 526/348 |
| 5,230,473 A | 7/1993 | Hagguist et al. | 241/3 |
| 5,240,530 A | 8/1993 | Fink | 156/94 |
| 5,271,207 A | 12/1993 | Knauer et al. | 73/119 |
| 5,272,236 A | 12/1993 | Lai et al. | 526/348.5 |
| 5,278,272 A | 1/1994 | Lai et al. | 526/348.5 |
| 5,292,845 A | 3/1994 | Kawasaki et al. | 526/336 |
| 5,367,007 A | 11/1994 | Richards | 524/59 |
| 5,546,450 A | 8/1996 | Suthard et al. | 379/12 |
| 5,565,132 A | 10/1996 | Salyer | 252/70 |
| 5,626,912 A | 5/1997 | Hendrix et al. | 427/288 |
| 5,714,224 A | 2/1998 | Gerry | 428/95 |
| 5,722,603 A | 3/1998 | Costello et al. | 241/20 |
| 5,800,898 A | 9/1998 | Gerry | 428/95 |
| 5,834,087 A | 11/1998 | Kajikawa et al. | 428/95 |
| 5,840,773 A | 11/1998 | Booij et al. | 521/49 |
| 5,863,665 A | 1/1999 | Kale et al. | 428/523 |
| 5,889,142 A | 3/1999 | Mohajer et al. | 528/480 |
| 5,916,410 A | 6/1999 | Goulet et al. | 156/344 |
| 5,932,724 A | 8/1999 | Sifniades et al. | 540/540 |
| 6,089,007 A | 7/2000 | Hamilton et al. | 57/14 |
| 6,107,430 A | 8/2000 | Dubois et al. | 526/348.5 |
| 6,241,168 B1 | 6/2001 | Young et al. | 241/23 |
| 6,284,186 B1 | 9/2001 | Hansen | 264/523 |
| 6,291,048 B1 | 9/2001 | Jerdee et al. | 428/97 |
| 6,300,398 B1 | 10/2001 | Jialanella et al. | 524/275 |
| 6,335,410 B1 | 1/2002 | Finlayson et al. | 526/348 |
| 6,342,280 B1 | 1/2002 | Patrick et al. | 428/34.6 |
| 6,387,967 B2 | 5/2002 | Muzzy et al. | 521/48 |
| 6,403,692 B1 | 6/2002 | Traugott et al. | 524/451 |
| 6,468,623 B1 | 10/2002 | Higgins | 428/95 |
| 6,468,643 B1 | 10/2002 | Kanbayashi et al. | 428/293.7 |
| 6,472,042 B1 | 10/2002 | Dibbern et al. | 428/95 |
| 6,475,592 B1 | 11/2002 | Irwin | 428/95 |
| 6,479,125 B1 | 11/2002 | Irwin, Sr. | 428/95 |
| 6,552,110 B1 | 4/2003 | Yalvac et al. | 524/274 |
| 6,569,935 B2 | 5/2003 | Jeong et al. | 524/456 |
| 6,572,965 B1 | 6/2003 | McGee et al. | 428/343 |
| 6,582,829 B1 | 6/2003 | Quinn et al. | 428/513 |
| 6,610,769 B1 | 8/2003 | Blanpain et al. | 524/426 |
| 6,642,312 B2 | 11/2003 | Park et al. | 525/191 |
| 6,656,601 B1 | 12/2003 | Kawachi et al. | 428/483 |
| 6,673,432 B2 | 1/2004 | Kiik et al. | 428/301.1 |
| 6,720,058 B1 | 4/2004 | Weeks et al. | 428/94 |
| 6,756,412 B2 | 6/2004 | Muzzy | 521/48 |
| 6,777,476 B2 | 8/2004 | Jeong et al. | 524/424 |
| 6,821,613 B1 | 11/2004 | Kagi et al. | 428/292.1 |
| 6,866,912 B2 | 3/2005 | Higgins et al. | 428/95 |
| 6,906,141 B2 | 6/2005 | Chum et al. | 525/191 |
| 6,951,900 B2 | 10/2005 | Blanchard et al. | 524/543 |
| 6,969,752 B1 | 11/2005 | Deng et al. | 526/292.2 |
| 7,014,886 B2 | 3/2006 | Vey et al. | 427/389.9 |
| 7,015,155 B2 | 3/2006 | Zhou et al. | 442/149 |
| 7,019,060 B1 | 3/2006 | Morrison et al. | 524/270 |
| 7,022,751 B2 | 4/2006 | Zhang et al. | 523/206 |
| 7,115,677 B2 | 10/2006 | Harashina et al. | 523/205 |
| 7,157,034 B2 | 1/2007 | Bristow et al. | 264/250 |
| 2001/0006990 A1 | 7/2001 | Jeong et al. | 524/456 |
| 2001/0018118 A1 | 8/2001 | Muzzy et al. | 428/295.1 |
| 2001/0046581 A1 | 11/2001 | Brumbelow et al. | 428/95 |
| 2002/0045694 A1 | 4/2002 | Trouve | 524/394 |
| 2002/0119281 A1 | 8/2002 | Higgins et al. | 428/95 |
| 2003/0017331 A1 | 1/2003 | Okochi et al. | 428/343 |
| 2003/0050378 A1 | 3/2003 | Blanchard et al. | 524/423 |
| 2003/0077242 A1 | 4/2003 | Sawhney | 424/78.26 |
| 2003/0087572 A1 | 5/2003 | Balthes et al. | 442/247 |
| 2003/0087973 A1 | 5/2003 | Muzzy | 521/48 |
| 2003/0125399 A1 | 7/2003 | Zhang et al. | 521/40 |
| 2003/0170420 A1 | 9/2003 | Higgins et al. | 428/95 |
| 2003/0175474 A1 | 9/2003 | Higgins et al. | 428/95 |
| 2003/0175475 A1 | 9/2003 | Higgins et al. | 428/95 |
| 2003/0232171 A1 | 12/2003 | Keith et al. | 428/95 |
| 2004/0127614 A1 | 7/2004 | Jiang et al. | 524/270 |
| 2004/0197547 A1 | 10/2004 | Bristow et al. | 428/325 |
| 2004/0266916 A1 | 12/2004 | Harashina et al. | 523/217 |
| 2005/0048253 A1 | 3/2005 | Nord et al. | 428/89 |
| 2005/0064178 A1 | 3/2005 | Gray et al. | 428/327 |
| 2005/0124744 A1 | 6/2005 | Demain | 524/425 |
| 2005/0250890 A1 | 11/2005 | Chen et al. | 524/425 |
| 2005/0266206 A1 | 12/2005 | Bieser et al. | 428/97 |
| 2006/0100335 A1 | 5/2006 | Yalvac et al. | 524/425 |
| 2006/0199887 A1 | 9/2006 | Liang et al. | 524/423 |
| 2006/0258792 A1 | 11/2006 | Spencer et al. | 524/494 |
| 2006/0281851 A1 | 12/2006 | Salsman | 524/493 |
| 2006/0293424 A1 | 12/2006 | Tse et al. | 524/270 |
| 2007/0009722 A1 | 1/2007 | Strait | 428/220 |

FOREIGN PATENT DOCUMENTS

| | | |
|---|---|---|
| JP | 2000 169621 A | 6/2000 |
| WO | WO 98/38376 A | 9/1998 |
| WO | WO 0000565 | 1/2000 |
| WO | WO 0022226 | 4/2000 |
| WO | WO 0192357 | 12/2001 |
| WO | WO 2004035910 | 4/2004 |
| WO | WO 2005052246 | 6/2005 |
| WO | WO 2006069205 | 6/2006 |

OTHER PUBLICATIONS

Addedo et al. "Merschtiger PP-Belag Fuer Autoboeden," 1991, Chemiefasern Textil-Industrie, Duetscher Fachverlag GMBH, vol. 41, No. 10, pp. 1235-1236.

Database WPI Week 200048, XP002477934, 2000-527931.

Strauss, et al., *The Handbook for Chemical Technicians*, 1976, McGraw Hill Book Company, Sections 1-4 and 2-1.

Wild, et al., "Determination of Branching Distributions in Polyethylene and Ethylene Copolymers," 1982, Journal of Polymer Science: Poly. Phys. Ed., vol. 20, pp. 441-455.

Cady, "The Role of Comonomer Type and Distribution in LLDPE Product Performance," 1985, SPE Regional Technical Conference, Quaker Square Hilton, Akron, Ohio, Oct. 1-2, pp. 107-119.

Randall, "A Review of High Resolution Liquid [13] Carbon Nuclear Magnetic Resonance Characterizations of Ethylene-Based Polymers," 1989, JMS-Rev. Macromol. Chem. Phys., C29 (2&3), pp. 285-297.

Zimm, et al., "The Dimensions of Chain Molecules Containing Branches and Rings," 1949, J. Chem. Phys., vol. 17 (12), pp. 1301-1314.

Rudin, "Measurement of Long-Chain Branch Frequency in Synthetic Polymers," *Modem Methods of Polymer Characterization*, 1991, John Wiley & Sons, New York pp. 103-112.

Shida, et al., "Correlation of Low Density Polyethylene Rheological Measurements with Optical and Processing Properties," 1977, Polymer Engineering Science vol. 17, No. 11, pp. 769-774.

Dealy, *Rheometers for Molten Plastics*, 1982, Van Nostrand Reinhold Co., pp. 97-99.

Ramamurthy, "Wall Slip in Viscous Fluids and Influence of Materials of Construction," 1986, Journal of Rheology, vol. 30(2), pp. 337-357.

Blackly, *Latex and Textiles*, section 19.4.2, p. 361.

* cited by examiner

METHODS AND SYSTEMS FOR RECYCLING CARPET AND CARPETS MANUFACTURED FROM RECYCLED MATERIAL

CROSS-REFERENCE TO RELATED APPLICATIONS

This application claims priority to and the benefit of U.S. Provisional Patent Application No. 60/865,611 filed Nov. 13, 2006. The entire disclosure of Application No. 60/865,611 is incorporated by reference herein for all purposes.

FIELD OF THE INVENTION

The present invention relates generally to methods and systems for reclaiming one or more polymer components from a carpet. The invention also relates to carpet comprising a post consumer carpet material reclaimed by the methods and systems disclosed. Still further, the invention also relates to methods for the manufacture of carpet comprising a material reclaimed from a post consumer carpet.

BACKGROUND OF THE INVENTION

Carpet, particularly nylon carpet, is the floor covering of choice in many households and businesses. Unfortunately, carpet has a limited lifespan and must eventually be replaced, with the resultant used carpet waste generally being sent to landfill. The vast quantities of carpet waste that are generated annually are burdensome to landfill capacity and have a negative impact on the environment. Furthermore, most carpet is made with nylon as the face fiber, a material that is relatively expensive. The quantity of used carpet discarded every year amounts to a loss of billions of dollars in potentially reusable carpet components.

To reduce the impact of used carpet on the environment, and to reclaim some of the financial loss due to discarding of fibers and other useful carpet material waste, carpet recycling would appear to be a logical solution. Recycling carpet, however, is difficult because its three major components are chemically and physically diverse. Most carpet consists of about 20-50 weight percent face fiber, the remainder being backing materials, commonly polypropylene, and an adhesive which attaches the carpet fiber to the backing material. The adhesive typically comprises a carboxylated styrene-butadiene (XSB) latex copolymer, and inorganic filler like calcium carbonate. Further, while cured thermosetting systems may under certain circumstance be recoverable, they are not capable of being reused as raw polymeric components in the manufacture of a second generation carpet.

To recycle carpet, the face fibers are typically separated from the adhesive and backing to be reprocessed into new products or to be chemically recycled. Various methods for the mechanical removal of carpet fiber have been used. These methods disadvantageously result in low yield of the recycled carpet fiber. For example, U.S. Pat. No. 6,610,769 discloses a method of employing an adhesive that can be completely removed by applying shear in the presence of an aqueous alkaline solution. In another example, U.S. Pat. No. 5,240,530 discloses a method of grinding carpet to a fiber length of less than about one-quarter inch and washing in a water bath to allow the various materials of the carpet to be separated by density.

In a further example, U.S. Pat. No. 5,230,473 describes a method for disintegrating, separating, and segregating whole carpet by loosening and debonding a latex/filler binder system by repeated application of highly pressurized fluids consisting of air, water, heated air, steam, and chemical solutions, and repeated stripping with rotating elements.

In another example, U.S. Pat. No. 5,722,603 describes a method of recovering face fiber from a carpet employing numerous steps of shredding and subjecting it to impact forces to reduce particle size, screen separating and washing the particles, followed by separation in water in a hydrocyclone. The washing operation optionally includes additives to improve the wetting and separation of the particles, such as sodium hydroxide and nonionic surfactant.

Another method to recycle carpet is to dissolve the carpet fiber itself from the remaining components. For example, U.S. Pat. No. 5,840,773 describes a method of extracting nylon from carpet waste by dissolving it in an alcohol-water agent. This method disadvantageously uses large quantities of organic solvent. In a further example, U.S. Pat. No. 5,889,142 describes a method of extracting nylon from carpet waste by dissolving it in a caprolactam-water mixture. This method also requires large quantities of organic solvent.

In still a further example, U.S. Pat. No. 5,932,724 describes a method of depolymerizing multi-component waste material which is fed to a reactor as an extruded melt and contacted with superheated steam at high temperature and pressure to provide caprolactam which can be purified and polymerized. Lastly, U.S. Pat. No. 5,916,410 describes the difficulty of recycling carpet fibers and describes a process involving the use of an organic softener.

Accordingly, there is a need to provide improved methods and systems for recycling one or more component parts of carpet. Further, there is a need to provide improved carpet recycling methods and systems that can yield reclaimed materials suitable for use in the manufacture of second generation carpets. Still further, there is a need for the manufacture of carpet structures comprising one or more materials that have been reclaimed from a post consumer carpet.

SUMMARY OF THE INVENTION

The present invention is based, in part, upon the discovery of a novel method for reclaiming one or more polymeric components from carpet. The carpet to be recycled can be any carpet. In one aspect, and without limitation, the carpet can be a post or pre consumer carpet, manufacturing remnants, quality control failures, and the like. The method generally comprises subjecting post consumer carpet comprising at least one polymer based component to a terpene containing solvent system. The polymer component within the post consumer carpet can at least substantially dissolves in the terpene containing solvent system. After dissolution of the polymer, any non soluble component materials can be removed from the solvent system, followed by the separation of the solvent system from the dissolved polymer component(s). In embodiments of the invention, the separation of the dissolved polymer components can be effected by the extraction of the terpene solvent. After extraction of the terpene solvent is at least substantially complete, a composition remains that comprised the initially dissolved polymer material to be reclaimed. This resulting composition can be further processed in order to render a polymer containing composition suitable for use in the manufacture of a second generation carpet, wherein one or more components of the second generation carpet comprises the polymer containing composition reclaimed by the process as summarized above.

In another broad aspect, the present invention provides a carpet comprising a plurality of fibers, a primary backing material having a face and a back side, an optional pre-coat material, an adhesive backing material and an optional secondary backing material, wherein the plurality of fibers are attached to the primary backing material and protrude from the face of the primary backing material and exposed on the back side of the primary backing material. In one aspect, the optional pre-coat layer is applied to the backside of the primary backing layer, followed by the adhesive backing material being disposed adjacent to the pre-coat layer. Alternatively, if the pre-coat layer is not present, the adhesive backing material can be disposed on the back side of the primary backing material. According to these aspects, the optional secondary backing material can be applied adjacent to the adhesive backing material. According to this broad aspect of the invention, any one or more components of the carpet structure described above can comprise a reclaimed polymer composition as described above. In one exemplary aspect, the adhesive backing material comprises a reclaimed polymer composition as described above. Still further, the manufactured carpet structure can be a broadloom carpet, a carpet tile, or even an area rug.

In still another broad aspect, the present invention also provides a method of making a carpet comprising one or more reclaimed polymer compositions as summarized above. The manufactured carpet comprises a face surface comprising yarn, a primary backing material, an adhesive backing material. As noted above, the carpet can optionally comprise a pre-coat layer disposed between the backside of the primary backing and the adhesive material. Further, the carpet can also optional comprise a secondary backing material wherein the primary backing material has a back surface opposite the face surface of the carpet. According to aspects of the method, the yarn is attached to the primary backing material, the adhesive backing material is applied to the back surface of the primary backing material and the optional secondary backing material is applied onto the adhesive backing material. In an exemplary aspect, the adhesive backing layer comprises a reclaimed polymer composition as summarized above.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION OF THE INVENTION

Figure 1:
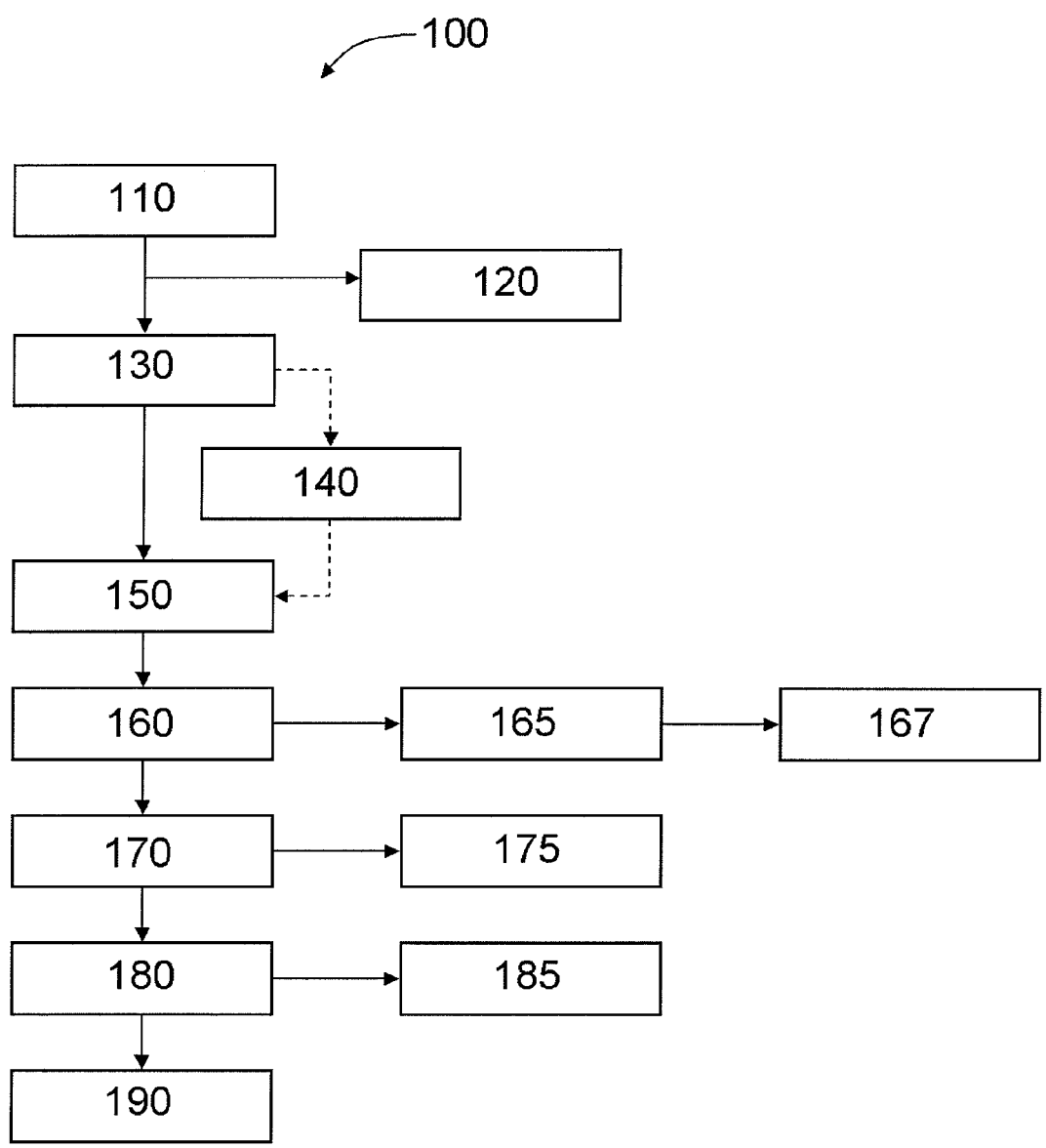
FIG. 1 is a schematic representation of an exemplary recycling system and method according to one aspect of the present invention.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "surface" includes aspects having two or more such surfaces unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The term "intimate contact" refers to the mechanical interaction between the back surface of the primary backing material and the adhesive backing material.

The term "substantial encapsulation" refers to the adhesive backing material significantly surrounding the yarn or fiber bundles at or in immediate proximity to the interface between the back surface of the primary backing material and the adhesive backing material.

The term "substantial consolidation" refers to the overall integrity and dimensional stability of the carpet that is achieved by substantially encapsulating the yarn or fiber bundles and intimately contacting the back surface of the primary backing material with the adhesive backing material. In one aspect, a substantially consolidated carpet possesses good component cohesiveness and good delamination resistance with respect to the various carpet components.

The term "integral fusing" is used herein in the same sense as known in the art and refers to heat bonding of carpet components using a temperature above the melting point of the adhesive backing material. In this aspect, integral fusing occurs when the adhesive backing material comprises the same polymer as either the fibers or primary backing material or both. However, integral fusing does not occur when the adhesive backing material comprises a different polymer than the fibers and primary backing material. In a further aspect, by the term "same polymer," it is meant that the monomer units of the polymers are of the same chemistry, although their molecular or morphological attributes may differ. Conversely, by the term "different polymer," it is meant that, irrespective of any molecular or morphological differences, the monomer units of the polymers are of different chemistries. Thus, in accordance with the various definitions of the present invention, a polypropylene primary backing material and a polyethylene adhesive backing material would not integrally fuse because these carpet components are of different chemistries.

The term "carpet component" is used herein to refer separately to carpet fiber bundles, a primary backing material, an optional pre-coat layer, an adhesive backing material, an optional reinforcing layer, and an optional secondary backing material.

The term "extrusion coating" is used herein in its conventional sense to refer to an extrusion technique wherein a polymer composition usually in pellet-form is heated in an extruder to a temperature elevated above its melt temperature and then forced through a slot die to form a semi-molten or molten polymer sheet. The semi-molten or molten polymer sheet is continuously drawn down onto a continuously fed greige good to coat the backside of the greige good with the polymer composition. It should also be understood that, as used herein, extrusion coating is not limited to applying a coating to greige good but, rather, can be used to apply a composition to any desired component of a carpet construction, including for example, primary backing and/or secondary backing.

In one aspect, the term "lamination technique" is used herein in its conventional sense refer to applying adhesive backing materials to greige goods by first forming the adhesive backing material as a solidified or substantially solidified film or sheet and thereafter, in a separate processing step, reheating or elevating the temperature of the film or sheet before applying it to the back surface of the primary backing material.

The term "heat content" is used herein to refer to the mathematical product of the heat capacity and specific gravity of a filler. Fillers characterized as having high heat content are used in specific embodiments of the present invention to extend the solidification or molten time of adhesive backing materials. *The Handbook for Chemical Technicians*, Howard J. Strauss and Milton Kaufmann, McGraw Hill Book Company, 1976, Sections 14 and 2-1, the disclosure of which is incorporated herein by reference, provides information on the heat capacity and specific gravity of select mineral fillers. The fillers suitable for use in the present invention do not change their physical state (i.e., remain a solid material) over the extrusion coating processing temperature ranges of the present invention. Exemplary preferred high heat content fillers possess a combination of a high specific gravity and a high heat capacity.

The term "implosion agent" is used herein to refer to the use of conventional blowing agents or other compounds which out-gas or cause out-gassing when activated by heat, usually at some particular activation temperature. In the present invention, implosion agents can be used to implode or force adhesive backing material into the free space of yarn or fiber bundles.

The term "processing material" is used herein to refer to substances such as spin finishing waxes, equipment oils, sizing agents and the like, which can interfere with the adhesive or physical interfacial interactions of adhesive backing materials. Optionally, at least some of the processing materials can be removed or displaced by a scouring or washing technique of the present invention whereby improved mechanical bonding is accomplished.

The terms "polypropylene carpet" and "polypropylene greige goods" are used herein to mean a carpet or greige goods substantially comprised of polypropylene fibers, irrespective of whether the primary backing material for the carpet or greige good is comprised of polypropylene or some other material.

The terms "nylon carpet" and "nylon greige goods" are used herein to mean a carpet or greige goods substantially comprised of nylon fibers, irrespective of whether the primary backing material for the carpet or greige good is comprised of nylon or some other material.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

The term "homogeneous ethylene polymer" as used to describe ethylene polymers is used in the conventional sense in accordance with the original disclosure by Elston in U.S. Pat. No. 3,645,992, the disclosure of which is incorporated herein by reference, to refer to an ethylene polymer in which the co-monomer is randomly distributed within a given polymer molecule and wherein substantially all of the polymer molecules have substantially the same ethylene to co-monomer molar ratio. As defined herein, both substantially linear ethylene polymers and homogeneously branched linear ethylene are homogeneous ethylene polymers.

Homogeneously branched ethylene polymers are homogeneous ethylene polymers that possess short chain branches and that are characterized by a relatively high short chain branching distribution index (SCBDI) or relatively high composition distribution branching index (CDBI). That is, the ethylene polymer has a SCBDI or CDBI greater than or equal to 50 percent, preferably greater than or equal to 70 percent, more preferably greater than or equal to 90 percent and essentially lack a measurable high density (crystalline) polymer fraction.

The SCBDI or CDBI is defined as the weight percent of the polymer molecules having a co-monomer content within 50 percent of the median total molar co-monomer content and represents a comparison of the co-monomer distribution in the polymer to the co-monomer distribution expected for a Bernoullian distribution. The SCBDI or CDBI of polyolefins can be conveniently calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204, the disclosures of all of which are incorporated herein by reference. However, the preferred TREF technique does not include purge quantities in SCBDI or CDBI calculations. More preferably, the co-monomer distribution of the polymer and SCBDI or CDBI is determined using $^{13}$C NMR analysis in accordance with techniques described, for example, in U.S. Pat. No. 5,292,845 and by J. C. Randall in *Rev. Macromol.*

*Chem. Phys.*, C29, pp. 201-317, the disclosures of which are incorporated herein by reference.

The terms "homogeneously branched linear ethylene polymer" and "homogeneously branched linear ethylene/α-olefin polymer" means that the olefin polymer has a homogeneous or narrow short branching distribution (i.e., the polymer has a relatively high SCBDI or CDBI) but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). In his polymerization process, Elston uses soluble vanadium catalyst systems to make such polymers, however others, such as Mitsui Petrochemical Industries and Exxon Chemical Company, have reportedly used so-called single site catalyst systems to make polymers having a homogeneous structure similar to polymer described by Elston. Further, U.S. Pat. No. 4,937,299 to Ewen et al. and U.S. Pat. No. 5,218,071 to Tsutsui et al., the disclosures of which are incorporated herein by reference, disclose the use of metallocene catalysts for the preparation of homogeneously branched linear ethylene polymers. Homogeneously branched linear ethylene polymers are typically characterized as having a molecular weight distribution, $M_w/M_n$, of less than 3, preferably less than 2.8, more preferably less than 2.3.

The terms "homogeneous linearly branched ethylene polymer" or "homogeneously branched linear ethylene/α-olefin polymer" do not refer to high pressure branched polyethylene which is known to those skilled in the art to have numerous long chain branches. In one aspect, the term "homogeneous linear ethylene polymer" generically refers to both linear ethylene homopolymers and to linear ethylene/α-olefin interpolymers. For example, a linear ethylene/α-olefin interpolymer possess short chain branching and n the α-olefin is typically at least one $C_3$-$C_{20}$ α-olefin (e.g., propylene, 1-butene, 1-pentene, 4-methyl-1-pentene, 1-hexene, and 1-octene).

In a further aspect, when used in reference to an ethylene homopolymer (i.e., a high density ethylene polymer not containing any comonomer and thus no short chain branches), the term "homogeneous ethylene polymer" or "homogeneous linear ethylene polymer" means the polymer was exemplary made using a homogeneous catalyst system such as, for example, that described Elston or Ewen or those described by Canich in U.S. Pat. Nos. 5,026,798 and 5,055,438, or by Stevens et al. in U.S. Pat. No. 5,064,802, the disclosures of all three of which are incorporated herein by reference.

In one aspect, the term "substantially linear ethylene polymer" is used herein to refer to homogeneously branched ethylene polymers that have long chain branching. The term does not refer to heterogeneously or homogeneously branched ethylene polymers that have a linear polymer backbone. For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

In a further aspect, long chain branching is defined herein as a chain length of at least 6 carbons, above which the length cannot be distinguished using $^{13}C$ nuclear magnetic resonance spectroscopy. The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285-297), the disclosure of which is incorporated herein by reference.

Although current $^{13}C$ nuclear magnetic resonance spectroscopy cannot determine the length of a long chain branch in excess of six carbon atoms, there are other known techniques useful for determining the presence of long chain branches in ethylene polymers, including ethylene/1-octene interpolymers. Two such exemplary methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.*, 17,1301 (1949) and Rudin, A., *Modern Methods of Polymer Characterization*, John Wiley & Sons, New York (1991) pp. 103-112, the disclosures of which are incorporated herein by reference.

In a further aspect, substantially linear ethylene polymers are homogeneously branched ethylene polymers and are disclosed in U.S. Pat. No. 5,272,236 and U.S. Pat. No. 5,278,272, the disclosures of which are incorporated herein by reference. Homogeneously branched substantially linear ethylene polymers are available from The Dow Chemical Company of Midland, Mich. as AFFINITY™ polyolefin plastomers and from Dupont Dow Elastomers JV as ENGAGE™ polyolefin elastomers. Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent Application 416,815-A, the disclosure of which is incorporated herein by reference. Preferably, a solution polymerization process is used to manufacture the substantially linear ethylene polymer used in the present invention.

The terms "heterogeneous" and "heterogeneously branched" mean that the ethylene polymer can be characterized as a mixture of interpolymer molecules having various ethylene to comonomer molar ratios. Heterogeneously branched ethylene polymers are characterized as having a short chain branching distribution index (SCBDI) less than about 30 percent. Heterogeneously branched linear ethylene polymers are available from The Dow Chemical Company as DOWLEX™ linear low density polyethylene and as ATTANE™ ultra-low density polyethylene resins. Heterogeneously branched linear ethylene polymers can be prepared via the solution, slurry or gas phase polymerization of ethylene and one or more optional alpha-olefin comonomers in the presence of a Ziegler Natta catalyst, by processes such as are disclosed in U.S. Pat. No. 4,076,698 to Anderson et al., the disclosure of which is incorporated herein by reference. Heterogeneously branched ethylene polymers are typically characterized as having molecular weight distributions, $M_w/M_n$, in the range of from 3.5 to 4.1 and, as such, are distinct from substantially linear ethylene polymers and homogeneously branched linear ethylene polymers in regards to both compositional short chain branching distribution and molecular weight distribution.

The substantially linear ethylene polymers useful in this invention surprisingly have excellent processability, even though they have relatively narrow molecular weight distributions (MWDs). In this aspect, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have theological properties such that as the polydispersity index increases, the $I_{10}/I_2$ value also increases. The rheological properties of substantially linear ethylene polymers also differ from homogeneously branched linear ethylene polymers which have relatively low, essentially fixed $I_{10}/I_2$ ratios.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

As summarized above, in one broad aspect, the present invention provides a carpet recycling system and method for reclaiming one or more polymers from a manufactured carpet structure, such as a post consumer carpet structure. The recycling system and method can be used to reclaim any polymeric material that is soluble in a terpene containing solvent system. Exemplary polymers that can be reclaimed and that are commonly found in manufactured carpet structures include, polyethylene polymers such as a low density polyethylene (LDPE), heterogeneously branched linear low density polyethylene (LLDPE), high density polyethylene (HDPE), heterogeneously branched ultra low density polyethylene (ULDPE), heterogeneously branched very low density polyethylene (VLDPE), heterogeneously branched linear low density polyethylene (LLDPE), heterogeneously branched linear very low density polyethylene (VLLDPE), a copolymer of ethylene and alpha olefin, polypropylene, a copolymer of propylene and alpha olefin, a copolymer of propylene and ethylene, ethylene vinyl acetate copolymer (EVA), ethylene methyl acrylate copolymer (EMA), grafted polyethylene polymers (e.g., a maleic anhydride extrusion grafted heterogeneously branched linear low polyethylene or a maleic anhydride extrusion grafted homogeneously branched ultra low density polyethylene), ethylene acrylic acid copolymer, ethylene ethyl acrylate copolymer, polystyrene, polyolefin, polybutylene, polycarbonate, ethylene propylene polymers, ethylene styrene polymers, and styrene block copolymers.

In an exemplary and non-limiting aspect, the methods and systems of the present invention can be used to reclaim homogeneously branched ethylene polymers from a post consumer carpet composition. Exemplary homogeneously branched ethylene polymers that can be reclaimed include those used as adhesive backing materials in the carpets structures described in U.S. patent application Ser. No. 11/193,277, filed Jul. 29, 2005, the entire disclosure of which is incorporated herein by reference for all purposes. In addition to the reclamation of these polymer components, as will be described in more detail below, the methods and systems of the present invention can also enable the reclamation of one or more non-terpene soluble component parts of a carpet composition, including for example, nylon yarn fibers, inorganic flame retardants, additives, and fillers.

The manufactured carpet structure comprising the polymer to be reclaimed can be any desired carpet structure, including without limitation, tufted carpet, needle-punched carpet, and even hand woven carpet. Additionally, the system and method can be used in connection with broadloom carpets, carpet tiles, and even area rugs, so long as the carpet structure comprises at least one polymer material soluble in a terpene based solvent system. In one aspect, the carpet structure to be recycled comprises fiber bundles, a primary backing material, an optional pre-coat layer, an adhesive backing material, an optional reinforcing layer, and an optional secondary backing material. To that end, a polymer material to be reclaimed can be present in any one or more of those component parts. For example, in one aspect, the fiber bundles can be comprised of polypropylene fiber bundles. According to this aspect, the polypropylene in fiber bundles can be reclaimed by the methods and systems described herein. In another aspect, however, the fiber bundles may comprise a nylon material that is not soluble in a terpene containing solution. According to this aspect, the polymer to be reclaimed can be in one or more other component parts of the carpet structure. For example, one or more polymer components as described above can be present in the adhesive backing material or even the optional secondary backing material. Accordingly, it should be understood that the carpet to be used as a feedstock in the methods and systems of the present invention are not limited to any particular form, structure, or materials, provided the carpet comprises at least one polymer that is soluble in a terpene solvent system. Further, it is contemplated that the carpet to be recycled can be any carpet. In one aspect, and without limitation, the carpet can be a post or pre consumer carpet, manufacturing remnants, quality control failures, and the like.

FIG. 1 schematically illustrates an exemplary recycling method and system 100 according to one aspect of the present invention. As shown, a post consumer carpet feedstock 110 is provided. The carpet feedstock 110 can again be any desired carpet structure comprising at least one polymer composition as described herein. As is commonly found in connection with post consumer carpet, extraneous materials that can be detrimental to the efficiency of the recycling process may be present in the post consumer carpet. Exemplary extraneous materials can include metallic materials such as staples, metal strips, nails, brads, or even tools that were used during the removal of the carpet from the location of its initial installation. Accordingly, the system and method can optionally comprise step 120 wherein any extraneous materials are first removed from the post consumer carpet. Once the extraneous materials are removed (if at all) the post consumer carpet can then be sent to a size reduction station 130. The size reduction can increase the surface area of the carpet that can contact the solvent system and thus facilitate the dissolution of polymer into the terpene solvent system. To that end, the size reduction can be accomplished by any conventional industrial shredder, guillotine, grinder, and the like. In one aspect, preferred size reduction equipment includes a Herbold Type SMS 60/100/G3/2 granulator. While any desired size reduction can also be used, in a preferred aspect the carpet is reduced to a plurality of chunks or pieces having an average length and/or width in the range of from 0.5 inches up to 4 inches.

Once the feedstock carpet has been reduced to appropriately sized pieces, the feedstock can optionally be pre-washed in a washing station 140 to remove any impurities such as dirt, sand, oil, inorganic waste, or organic waste that may be present in the post consumer carpet. The optional pre-wash of the sized reduced carpet pieces can comprises a solvent wash utilizing, for example, water, acetone, or even an organic solvent.

After the optional pre-washing, the carpet feedstock is introduced into a solvent system 150 comprising a terpene. Once introduced into the solvent system, any terpene soluble polymeric material as described herein will dissolve in the terpene solvent. If desired, the solvent system can be heated above ambient temperature to facilitate the dissolution of polymer into the solvent. For example, according to aspects of the invention it can be desirable to heat the solvent to near but still below the boiling point of the terpene solvent system. Additionally, in still other aspects, the solvent system can be maintained under elevated pressures. As one of skill in the art will appreciate, a pressurized vessel can be used to maintain the solvent system under increased pressure. By increasing the pressure, the solvent system can be heated to even higher temperatures without reaching the boiling point of the pressurized solvent, further facilitating the dissolution of polymer in the solvent system.

Figure 2A:
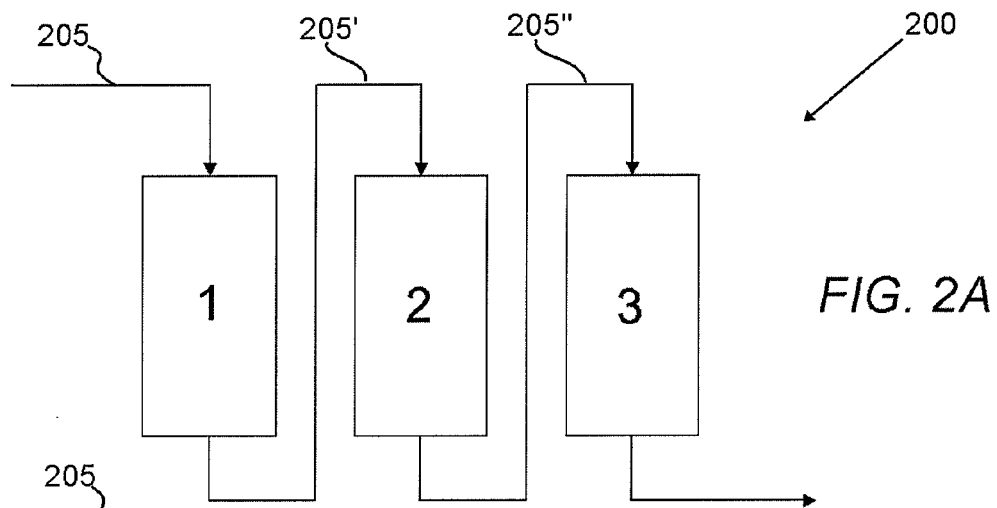
FIG. 2a, FIG. 2b, and FIG. 2c are schematic illustrations of an exemplary multiple vessel counter flow solvent dissolution system of the present invention.

The dissolution step can comprise contacting the carpet with the solvent system in a single vessel maintained under desired temperature and pressure conditions as described above, for a sufficient period of time to at least substantially dissolve any terpene soluble polymers present in the carpet. However, in an alternative aspect, the dissolution step can comprise a plurality of sequential dissolution vessels in which an initial carpet feedstock is sequentially introduced into the plurality of dissolution vessels. The use of a plurality of vessels can maximize the concentration of dissolved polymer that can be achieved in a given vessel prior to devolatilization as described below. With reference to FIG. 2, an exemplary dissolution system 200 comprised of three sequential counter flow tanks is illustrated. In FIG. 2a, carpet 205 is first introduced into vessel 1 initially comprised of pure solvent, wherein a first portion of terpene soluble polymeric materials within the carpet begin to dissolve into the solvent system. Due to varying rates of dissolution associated with different materials that may be present in the carpet, the efficiency of vessel 1 in dissolving substantially all of the terpene soluble polymer may significantly decrease before the solvent reaches a maximum concentration of solubilized polymer or before substantially all of the terpene soluble polymer has been dissolved. Accordingly, after a first portion of the polymer has dissolved, the remaining carpet 205', including non soluble material and additional terpene soluble polymer can be removed from vessel 1 and introduced into vessel 2, initially containing pure solvent. Once in vessel 2, a second portion of terpene soluble polymer will dissolve in the solvent system. However, again due to varying rates of dissolution associated with different materials that may be present in the carpet, the efficiency of vessel 2 in dissolving substantially all of the remaining terpene soluble polymer may significantly decrease before the solvent reaches a maximum concentration of solubilized polymer. Accordingly, after a second portion of the polymer has dissolved in vessel 2, the remaining carpet 205", including non soluble material and additional terpene soluble polymer can be removed from vessel 2 and subsequently introduced into vessel 3, again initially containing pure solvent. This process can be repeated until the maximum concentration of dissolved polymer has been reached in vessel 1, at which time vessel 1 can be taken off line for subsequent devolatilization and reclamation of the dissolved polymer.

Figure 2B:
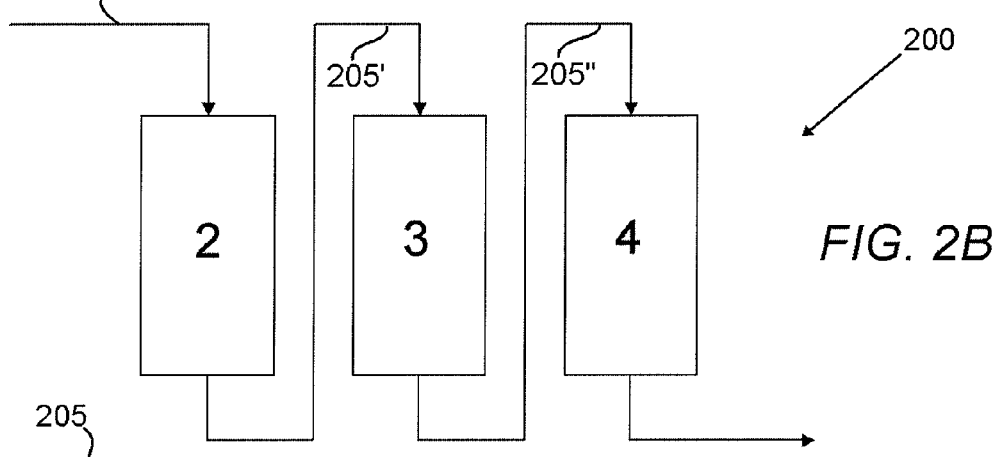
Figure 2C:
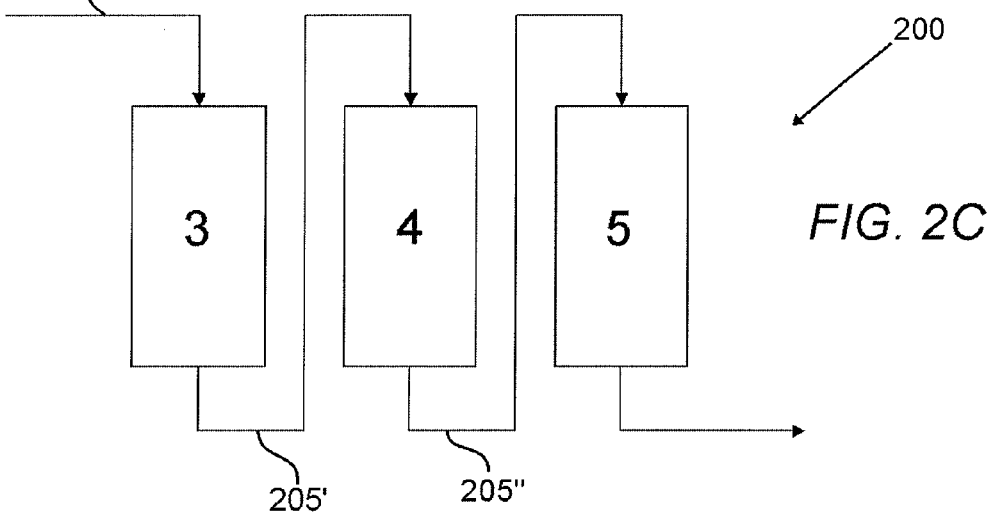

As shown in FIG. 2b, once vessel 1 has been removed, vessels 2 and 3 can each be advanced forward and a new vessel 4 containing pure solvent can be introduced into the system. The sequential dissolution process as described above can then be repeated until a maximum concentration of dissolved polymer is reached in vessel 2, at which time vessel 2 can then be taken off line for subsequent devolatilization and reclamation of the dissolved polymer. As shown, in FIG. 2c, once vessel 2 is removed, vessel three and 4 can each be advanced forward and new vessel 5 can be introduced. It should be understood that although the exemplified counter flow process is shown comprising three dissolution vessels, the process can utilize any desired number of devolatilization vessels and is not limited to the exemplified aspect.

The terpene solvent system 150 comprises at least one terpene having the generic structure:

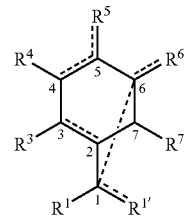

wherein each "----" connotes an optional bond; at least two of the optional bonds are present; $R^1$, $R^{1'}$, and $R^5$ are independently selected from alkyl and carboxyl; $R^3$, $R^4$, and $R^7$ are independently selected from hydrogen, hydroxyl, carbonyl, halogen, alkyl, alkoxyl, carboxyl, and acyl; and $R^6$ is selected from hydrogen, hydroxyl, or oxygen. In an exemplary aspect, the terpene solvent system can comprise a terpene as set forth above, further wherein: $R^1$ and $R^5$ are methyl; the optional bond between C1 and C2 is present and $R^{1'}$ is methylene; the optional bond between C1 and C2 is present; and wherein $R^3$, $R^4$, and $R^7$ are hydrogen. In another exemplary aspect, the terpene can have the general structure set forth above wherein the optional bonds between C5 and C6 and between C6 and $R^6$ are absent, and wherein C6 has an S configuration.

In exemplary aspects, the terpene can be dipentene (racemic limonene). Alternatively, the terpene can be nonracemic 1-methyl-4-prop-1-en-2-yl-cyclohexene (either R or S limonene). Still further, the terpene can be the (S)-enantiomer (unnatural limonene). In another aspect, the terpene is 2-methyl-5-(prop-1-en-2-yl)cyclohex-2-enone.

In an alternative aspect, the at least one terpene can be D-Limonene, having the structure:

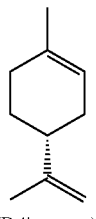

(D-limonene).

In an alternative aspect, the at least one terpene can be carveol, having the structure:

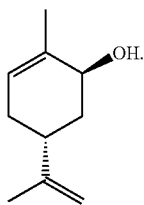

Still further, the at least one terpene can have the structure:

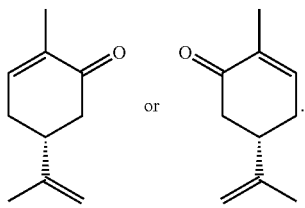

In still another aspect, the at least one terpene can have the structure:

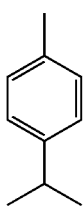

(1-methyl-4-(1-methylethyl)benzene).

In another aspect, the at least one terpene can be pinene. To that end, in one exemplary aspect the pinene can be an alpha pinene having the structure:

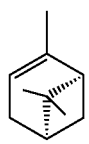

(alpha-pinene).

Alternatively, the pinene can be a beta pinene having the structure

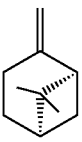

(beta-pinene).

It is also contemplated that, in certain aspects, solvents known to those of skill in the art having a similar solubility parameter, a similar dielectric constant, a similar miscibility, a similar hydrophilicity, and similar hydrophobicity, a similar density, a similar boiling point, and/or a similar chemical structure can be substituted for, or combined with, the disclosed solvents.

In addition to the terpene, the solvent system can optionally further comprise at least one secondary solvent. For example, an added secondary or co-solvent can be used as a separating agent to facilitate separation of a dissolved polymer from the terpene containing solution. In one aspect, the secondary solvent can comprise one or more hydrocarbons selected from, for example and not meant to be limiting, pentane, hexane, cyclohexane, heptane, and octane; one or more alcohols selected from, for example and not meant to be limiting, methanol, ethanol, propanol, butanol, pentanol, tertiary butanol, and isopropyl; one or more ketones selected from, for example and not meant to be limiting, acetone, butanone, cyclohexanone; or one or more hydrocarbons; or a mixture thereof. Accordingly, the at least one terpene can be present in the solvent system in any desired amount in the range of from about 25% to about 100% by volume and the at least one secondary solvent can be present at from about 0% to about 25% by volume. Still further, in another aspect, the at least one terpene can be present at from about 50% to about 100% by volume and the at least one secondary solvent is present at from about 0% to about 50% by volume. In still another exemplary aspect, the at least one terpene can be present in an amount of from about 75% to about 100% by volume and the at least one secondary solvent can be present in an amount of from about 0% to about 25% by volume.

It will be appreciated that the optimum weight ratio of solvent to material being dissolved will vary depending, in part, upon the particular solvent system being used and/or the composition of the particular carpet structure being dissolved. However, in certain exemplary aspects and without limitation, the weight ratio of terpene solvent to terpene soluble polymer present within the carpet material, based upon total weight percent, can be approximately 1:1, 5:1, 7:1, 10:1, 15:1, 20:1, 25:1, or even up to 50:1. Further, as one of skill in the art will appreciate, it can be desirable to minimize the amount of solvent used as this will reduce the amount of solvent to be extracted from the solution during the devolatilization process.

After dissolution of the polymer is at least substantially complete, the terpene solution comprising the dissolved polymer can then be conveyed to a separation station 160 whereby any undissolved components can be separated from the solvent system. For example, an initial carpet feedstock to be recycled can include, for example and not meant to be limiting, inorganic materials, such as fillers and flame retardants, and polymeric materials such as nylon faces fibers and other polymers that are not be soluble in the terpene solvent system. These materials 165 can be mechanically removed from the solution during this subsequent separation step 160. Any conventional method for removal of solids from a solution can be used. For example, non-soluble yarns and or fiber bundles can be separated by conventional filtration using for example a strainer basket or a filter bag. Non-soluble particulate solids, such as inorganic fillers and flame retardants can be recovered using techniques such as centrifugal separation, membrane filtration, vacuum belt filtration, candle tube filtration, and vibratory shear enhanced filtration processs (VSEP). In an exemplary aspect, preferred equipment for separation of materials 165 includes the PANNEVIS RT-GT HGD Vacuum Belt Filter from Larox, Inc. Further, once separated, these non-soluble materials can be further processed for subsequent use in second generation carpet materials. Subsequent processing can include for example, step 167 for drying the separated non-soluble materials of any residual solvent. During this drying step 167, the residual solvent can be collected for reuse in the recycling system described herein.

Following the separation of any non-soluble component materials 165, the terpene solvent system comprising the dissolved polymer is subjected to devolatilization 170. The devolatilization can utilize any conventional means for separating the terpene solvent from the dissolved polymer compositions, including, for example and without limitation, distillation, vacuum pressure, a flash tank process, vented extruder, or even a wiped film evaporator. In an exemplary aspect, the terpene solvent can be extracted from the solution by distillation, resulting in the at least substantial separation of the terpene solvent from the initially dissolved polymer material. During the separation, extracted solvent system 175 can be collected for subsequent use as solvent in the recycling systems and methods described herein. In an exemplary aspect, preferred equipment for extracting terpene solvent includes the use of the 7 liter CSTR from LIST USA, Inc.

Following the initial devolatilization step 170, it should be understood that the remaining reclaimed polymer composition can, depending on the composition of the post consumer carpet, comprise a blend of two or more soluble polymeric materials. Further, the initially reclaimed polymer material can also comprise one or more polymeric additives or event contaminants that were present in the original carpet pieces. It is even contemplated that the reclaimed polymer composition will still comprise residual unextracted terpene solvent. Accordingly, the reclaimed polymer composition can optionally be further processed to remove any one or more of these portions of the polymer composition. For example, in the exemplary aspect shown in FIG. 1, the reclaimed polymer composition can be conveyed to an optional second or subsequent devolatilization station 180 to remove residual solvent. The second or any subsequent devolatilization step can again use the equipment references above in connection with the first devolatilization step. Exemplary equipment can include the WE series 2" non intermeshing, counter rotating, vented, 54:1 L/D twin screw extruder from NFM Welding Engineers.

In an exemplary aspect, the optional second devolatilization step can, for example, comprising passing the initially reclaimed polymer composition from the first devolatilization step 170 through a vented extruder to render reclaimed polymer 190. The reclaimed polymer can be further processed into any desired form for subsequent use and/or storage. For example, the reclaimed polymer 190 can be palletized using, for example, a Gala under water pelletizer or a Conair strand pelletizer.

As described in further detail below, the reclaimed polymer 190 can be used in the manufacture of one or more components of a second generation carpet composition. Still further, any residual terpene solvent 185 that may have been present in the initially reclaimed polymer material of step 170 can also be collected during the extrusion process and subsequently reused in further recycling processes. It should also be understood that the process as described herein can according to some embodiments be configured for use as a batch wise process. Alternatively, the process as described can also be configured as a continuous process.

According to aspects of the invention, the reclaimed polymer compositions resulting from the process described herein can exhibit physical properties that are indicative of their suitability for subsequent use in the manufacture of second generation carpets. For example, in one aspect the reclaimed polymer compositions of the present invention exhibit a melt flow rate, as measured according to ASTM D1238-04C, in the range of from 2 g/10 min to 200 g/10 min, including exemplary ratios of 10 g.10 min, 25 g/10 min, 50 g/10 min, 75 g/10 min, 10 g/10 min, 125 g/10 min, 150 g/10 min, 175 g/10 min, and any value within a range of melt flow rates derived from any two of these values. In still other aspects, the reclaimed polymer compositions can exhibit a melt flow rates, as measured according to ASTM D1238-04C in the range of from 20 g/10 min to 10 g/10 min, including exemplary melt flow rates of 30 g/10 min, 40 g/10 min, 50 g/10 min, 60 g/10 min, 70 g/10 min, 80 g/10 min, 90 g/10 min, and any melt flow rates within a range of melt flow rates derived from any two of these values.

Figure 3:
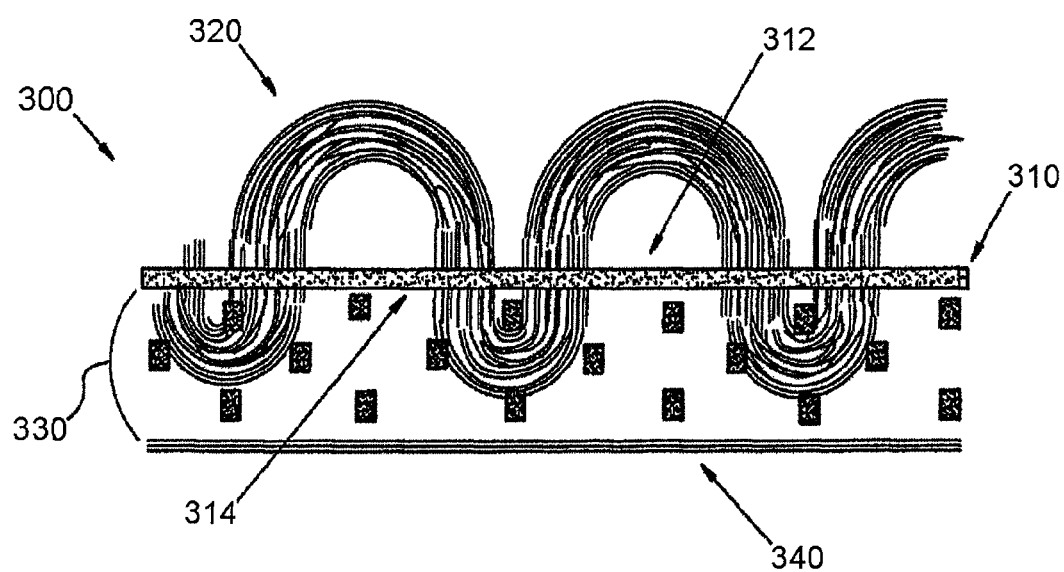
FIG. 3 is an illustration of an exemplary tufted carpet.

In accordance with another broad aspect, the present invention provides a second generation carpet comprising a polymer composition reclaimed from the process described above. In a preferred aspect, the second generation carpet can be a tufted broadloom carpet. In an alternative aspect, the second generation carpet can be a tufted carpet tile. As illustrated in FIG. 3, an exemplary tufted carpet 300 is shown. The tufted carpet 300 is a composite structure which includes yarn 320 (which is also known as a fiber bundle), a primary backing material 310 having a face surface 312 and a back surface 314, an adhesive backing material 330 and, optionally, a secondary backing material 340. To form the face surface of tufted carpet, the yarn is tufted through the primary backing material such that the longer length of each stitch extends through the face surface of the primary backing material.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back side of the primary backing material comprises tight, unextended loops.

The combination of tufted yarn and a primary backing material without the application of an adhesive backing material or secondary backing material is referred to in the carpet industry as raw tufted carpet or greige goods. Greige goods become finished tufted carpet with the application of an adhesive backing material and an optional secondary backing material to the back side of the primary backing material. Finished tufted carpet can be prepared as broad-loomed carpet in rolls typically 6 or 12 feet wide. Alternatively, carpet can be prepared as carpet tiles, which are, for example and without limitation, typically 24 inches square in the United States and 50 cm. square elsewhere.

The adhesive backing material is applied to the back face of the primary backing material to affix the yarn to the primary backing material. In one aspect, the adhesive backing substantially encapsulates a portion of the back stitching of the yarn, penetrates the yarn, and binds individual carpet fibers. Properly applied adhesive backing materials do not substantially pass through the primary backing material.

As noted above and shown in FIG. 3, the carpet of the invention preferably also includes an optional secondary backing material. Preferably, the secondary backing material is laminated directly to an extruded adhesive backing layer(s) while the extrudate is still molten after extrusion coating. It has been found that this technique can improve the penetration of the extrusion coating into the primary backing.

Alternatively, the secondary backing material can be laminated in a later step by reheating and/or remelting at least the outermost portion of the extruded layer or by a coextrusion coating technique using at least two dedicated extruders. Also, the secondary backing material can be laminated through some other means, such as by interposing a layer of a polymeric adhesive material between the adhesive backing material and the secondary backing material. Suitable polymeric adhesive materials include, but are not limited to, ethylene acrylic acid (EM) copolymers, ionomers and maleic anhydride grafted polyethylene compositions.

The material for the secondary backing material can be a conventional material such as the woven polypropylene fabric sold by Propex, Inc. under the designation Action Bac®. This material is a leno weave with polypropylene monofilaments running in one direction and polypropylene yarn running in the other. A suitable example of such a material is sold by Propex, Inc. under the designation Style 3870. This material has a basis weight of about 2 OSY. In another aspect, the secondary backing material used with the present invention can be a woven polypropylene fabric with monofilaments running in both directions.

Alternatively, the secondary backing material can be a non-woven fabric. Several types are available, including, but not limited to, needle punched, spun-bond, wet-laid, melt-blown, hydraentangled, and air entangled. In one aspect, it is preferred that the secondary backing is made from a polyolefin to facilitate recycling. For example, the non-woven fabric can be spun-bond polypropylene fabric. Typically, spun-bond fabric is made from extruded and air-drawn polymer filaments which are laid down together and then point bonded, for example by a heated calendar roll. The basis weight of such a spun-bond secondary backing can be varied, preferably between 35 and 80 grams/m$^2$ (gsm) more preferably between 60 and 80 gsm. Most preferably, the basis weight is 77-83 gsm (e.g., 80 gsm). One factor favoring a higher basis weight for the spun-bond fabric is that the higher basis weight fabric is less likely to be melted when brought into contact with the molten extruded backing. In another example, it is preferred to use a needle punched non-woven secondary backing. An exemplary polypropylene non-woven needle punched secondary backing material is available from Propex, Inc. under the designation style number 9001641, having a basis weight of about 3.5 OSY.

In still another aspect, the secondary backing can be a woven needle punched polypropylene fabric such as Soft-Bac® manufactured by Shaw Industries, Inc. In this exemplary aspect, this material has been enhanced by having about 1.5 OSY of polypropylene fibers needle punched onto one side of it and has a total basis weight of about 3.5 OSY. This needle punched fabric is laminated so as to have the polypropylene fibers embedded within the adhesive backing layer. As a result, the strands of the woven polypropylene fabric exposed. This embodiment has been shown to have improved glue down properties as compared to an embodiment without the needle punched fibers because, without the needle punched fibers, the strands of the woven polypropylene fabric are at least partially embedded in the adhesive backing layer. As such, the surface area for gluing is reduced. It was also noted that the back of the carpet made in this embodiment was much less abrasive than that found with traditional latex backed carpet. The carpet is also more flexible than traditional latex backed carpet. Consequently, this embodiment is preferred for making areas rugs and the like. Still other materials can be used for the secondary backing. For example, if an integral pad is desired, polyurethane foam or other cushion material can be laminated to the back side of the carpet. Such backings can be used for broadloom carpet as well as for carpet tile.

According to an aspect of the present invention, the adhesive backing material of the exemplified tufted carpet structure described above is a recycled adhesive backing composition. At least a portion of the recycled adhesive composition is comprised of one or more reclaimed polymeric materials that have been reclaimed from post consumer carpet as described above. To that end, the second generation adhesive compositions of the present invention comprise a polymeric portion and a filler portion. According to some aspects, the polymeric portion of the recycled adhesive composition can be comprised entirely of reclaimed polymer material. Alternatively, the polymeric portion of the recycled adhesive can be a combination of reclaimed polymer and a virgin or non-recycled polymer component. Accordingly, the recycled polymer portion of the adhesive composition can be present in any amount in the range of from greater than 0 weight to about 100 weight percent of the polymer component of the adhesive composition, based on the total weight of the polymer portion of the adhesive composition. For example, the reclaimed polymer can also be present, without limitation, in exemplary relative weight percentages of 5 wt %, 10 wt %, 15 wt %, 20 wt %, 25 wt %, 30 wt %, 35 wt %, 40%, 45 wt %, 50%, 55%, 60%, 65%, 70%, 75%, 80%, 85%, 90%, and 95%. Still further, the reclaimed polymer portion can be present in an amount within any range of from a first percentage to a second percentage wherein the first and second percentages are selected from any of the above mention weight percentage values.

As one of skill in the art will appreciate, the actual composition of the reclaimed polymer material used in the adhesive composition will depend upon the particular terpene soluble components that were present in the initial carpet material subjected to the recycling process described above. According to aspects of the invention, the reclaimed polymer composition can comprise one or more polyolefin polymers. For example, the reclaimed polymer composition can comprise a polyethylene polymer such as a low density polyethylene (LDPE), heterogeneously branched linear low density polyethylene (LLDPE), high density polyethylene (HDPE), heterogeneously branched ultra low density polyethylene (ULDPE), heterogeneously branched very low density polyethylene (VLDPE), heterogeneously branched linear low density polyethylene (LLDPE), heterogeneously branched linear very low density polyethylene (VLLDPE), a copolymer of ethylene and alpha olefin, polypropylene, a copolymer of propylene and alpha olefin, a copolymer of propylene and ethylene, ethylene vinyl acetate copolymer (EVA), ethylene methyl acrylate copolymer (EMA), grafted polyethylene polymers (e.g., a maleic anhydride extrusion grafted heterogeneously branched linear low polyethylene or a maleic anhydride extrusion grafted homogeneously branched ultra low density polyethylene), ethylene acrylic acid copolymer, ethylene ethyl acrylate copolymer, polystyrene, polyolefin, polybutylene, polycarbonate, ethylene propylene polymers, ethylene styrene polymers, and styrene block copolymers. Still further, it should be understood that the recycled polymer portion of the adhesive can comprise any combination of the aforementioned polymers in any varying relative weight percentages.

In addition to the above listed polyethylene polymer, the reclaimed polymeric composition can also comprise one or more non-polymeric materials that were present in the first generation carpet to be recycled may also be present in combination with the reclaimed polyolefin material (again by virtue of having been present in the initial carpet feedstock being recycled). Therefore, exemplary and non-limiting non-polyolefin compositions that may be present in the recycled polymer portion of adhesive composition include, without limitation, ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as olefin monomers or aliphatic α-olefin monomers or copolymers thereof, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

As noted above, the polymeric portion of the adhesive composition can comprise a blend of recycled polymer composition and one or more virgin polymer compositions. To that end, when present in the polymer portion of the adhesive composition, the virgin polymer portion can be present in an amount in the range of from about 0 to about 99 weight percent of the total polymer portion based on the total weight of the polymer components present within the polymer portion of the adhesive composition. Further exemplary weight percentages include, without limitation, 5%, 10%, 15 wt %, 20 wt %, 25 wt %, 30 wt %, 35 wt %, 40 wt %, 45 wt %, 50 wt %, 55 wt %, 60 wt %, 65 wt %, 70%, 75 wt %, 80 wt %, 85 wt %, 90 wt % or even 95 wt %. In still another aspect, the virgin polymer component of the adhesive composition can be present in an amount within any range of from a first percentage to a second percentage wherein the first and second percentages are selected from any of the above mention weight percentage values.

When present in the adhesive composition, the virgin polymer component can comprise a polyethylene polymer such as a low density polyethylene (LDPE), heterogeneously branched linear low density polyethylene (LLDPE), high density polyethylene (HDPE), heterogeneously branched ultra low density polyethylene (ULDPE), heterogeneously branched very low density polyethylene (VLDPE), heterogeneously branched linear low density polyethylene (LLDPE), heterogeneously branched linear very low density polyethylene (VLLDPE), a copolymer of ethylene and alpha olefin, polypropylene, a copolymer of propylene and alpha olefin, a copolymer of propylene and ethylene, ethylene vinyl acetate copolymer (EVA), ethylene methyl acrylate copolymer (EMA), grafted polyethylene polymers (e.g., a maleic anhydride extrusion grafted heterogeneously branched linear low polyethylene or a maleic anhydride extrusion grafted homogeneously branched ultra low density polyethylene), ethylene acrylic acid copolymer, ethylene ethyl acrylate copolymer, polystyrene, polyolefin, polybutylene, polycarbonate, ethylene propylene polymers, ethylene styrene polymers, and styrene block copolymers.

In a preferred aspect, the virgin polymer component comprises a homogeneously branched linear ethylene polymers such as substantially linear ethylene polymer. In an exemplary aspect, a preferred substantially linear ethylene polymers that can be used in the virgin polymer component include the Affinity® series of polymers available from Dow Chemicals. These preferred exemplary ethylene polymers offer unique advantages for extrusion coated carpet backing applications, especially for commercial and residential carpet markets. For example, they have relatively low solidification temperatures, relatively good adhesion to polypropylene which can be beneficial when the fiber bundles are comprised of polypropylene, and lower modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE).

In the present invention, during extrusion coating of the backside of carpet to apply the adhesive backing material, the adhesive composition provides good penetration of carpet yarns (fiber bundles) and also allows for good consolidation of the fibers within the yarn. In one aspect, when used as an adhesive backing for tufted carpets, a tuft bind (or tuft lock) strength of 3.25 pounds (1.5 kg) or more can be achieved, more preferably 5 pounds (2.3 kg) or more, and even most preferably 7.5 pounds (3.4 kg) or more. In a further aspect, tuft bind strength can be also be increased by increasing the molecular weight of the selected virgin polymer component present in the adhesive composition. However, a higher polymer molecular weight selected for improved tuft bind strength is contra to the requirement of a lower polymer molecular weight which is generally needed for good yarn penetration and good extrusion coatability. As such, the properties of the blended recycled and virgin polymer components should be chosen such that a balance is maintained between extrusion coatability and abrasion resistance as well as between chemical resistance and carpet flexibility.

In a further aspect, when carpet greige good is backed with an adhesive composition comprising the substantially linear ethylene polymers and homogeneously branched linear ethylene polymers, (whether present as a portion of a virgin polymer, a recycled polymer portion, or a combination thereof) the low flexural modulus of these can offer advantages in ease of carpet installation and general carpet handling. In this aspect, the substantially linear ethylene polymers, in particular, show enhanced mechanical adhesion to polypropylene when employed as an adhesive backing material, which improves the consolidation and delamination resistance of the various carpet layers and components, i.e., polypropylene fibers, fiber bundles, the primary backing material, the adhesive backing material and the secondary backing material when optionally applied. Consequently, in this exemplary aspect, exceptionally good abrasion resistance and tuft bind strength can be obtained. As one skilled in the art will appreciate, good abrasion resistance is important in commercial carpet cleaning operations as good abrasion resistance generally improves carpet durability.

Operationally, the use of the preferred substantially linear ethylene polymers and homogeneously branched linear ethylene polymers as a component of the adhesive (whether present as a portion of a virgin polymer, a recycled polymer portion, or a combination thereof) can allow for the elimination of secondary backing materials and as such can result in significant manufacturing cost savings. In addition, carpets adhesively backed with the preferred polymer adhesive can provide a substantial fluid and particle barrier which enhances the hygienic properties of carpet.

An exemplary preferred homogeneously branched ethylene polymer that can be used as a virgin polymer or that can be present in a post consumer carpet to be recycled has a single melting peak in the temperature range of between $-30°$ C. and $150°$ C., as determined using differential scanning calorimetry. The most preferred homogeneously branched ethylene polymer for use in the invention is a substantially linear ethylene polymer characterized as having (a) a melt flow ratio, $I_{10}/I_2 \geqq 5.63$, (b) a molecular weight distribution, $M_w/M_n$, as determined by gel permeation chromatography and defined by the equation:

$$(M_w/M_n) \leqq (I_{10}/I_2) - 4.63,$$  i.

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ α-olefin and have the same $I_2$ and $M_w/M_n$ and wherein the respective critical shear rates of the substantially linear ethylene polymer and the linear ethylene polymer are measured at the same melt temperature using a gas extrusion rheometer, and (d) a single differential scanning calorimetry, DSC, melting peak between $-30°$ C. and $150°$ C.

In one example, the determination of the critical shear rate in regards to melt fracture as well as other rheology properties such as "rheological processing index" (PI) can be performed using a gas extrusion rheometer (GER). One exemplary gas extrusion rheometer is described by M. Shida, R. N. Shroff and L. V. Cancio in *Polymer Engineering Science* Vol. 17, No. 11, p. 770 (1977), and in "Rheometers for Molten Plastics" by John Dealy, published by Van Nostrand Reinhold Co. (1982) on pp. 97-99, the disclosures of both of which are incorporated herein by reference. In one example, the GER experiments are performed at a temperature of $190°$ C., at nitrogen pressures between about 250 and about 5500 psig (about 1.7 and about 37.4 MPa) using a 0.0754 mm diameter, 20:1 L/D die with an entrance angle of about $180°$ C. For the preferred substantially linear ethylene polymers described herein, the PI is the apparent viscosity (in kpoise) of a material measured by GER at an apparent shear stress of $2.15 \times 10^6$ dyne/$^{cm2}$ ($2.19 \times 10^4$ kg/!m²). The substantially linear ethylene polymer for use in the invention have a PI in the range of 0.01 kpoise to 50 kpoise, preferably 15 kpoise or less. In one exemplary aspect, the substantially linear ethylene polymers used herein also have a PI less than or equal to 70 percent of the PI of a linear ethylene polymer (either a Ziegler polymerized polymer or a homogeneously branched linear polymer as described by Elston in U.S. Pat. No. 3,645,992) having an $I_2$ and $M_w/M_n$ each within ten percent of the substantially linear ethylene polymer.

In another aspect, an apparent shear stress versus apparent shear rate plot is used to identify the melt fracture phenomena and quantify the critical shear rate and critical shear stress of ethylene polymers. According to Ramamurthy in the *Journal of Rheology*, 30(2), 337-357, 1986, the disclosure of which is incorporated herein by reference, above a certain critical flow rate, the observed extrudate irregularities may be broadly classified into two main types: surface melt fracture and gross melt fracture. Typically, surface melt fracture occurs under apparently steady flow conditions and ranges in detail from loss of specular film gloss to the more severe form of "sharkskin." Herein, as determined using the above-described GER, the onset of surface melt fracture (OSME) can be characterized at the beginning of losing extrudate gloss at which the surface roughness of the extrudate can only be detected by 40×. magnification. As described in U.S. Pat. No. 5,278,272, the critical shear rate at the onset of surface melt fracture for the substantially linear ethylene interpolymers and homopolymers is at least 50 percent greater than the critical shear rate at the onset of surface melt fracture of a linear ethylene polymer having essentially the same $I_2$ and $M_w/M_n$.

Further, gross melt fracture can occur at unsteady extrusion flow conditions and ranges in detail from regular (alternating rough and smooth, helical, etc.) to random distortions. Preferably, for commercial acceptability to maximize the performance properties of films, coatings and moldings, surface defects should be minimal, if not absent. The critical shear stress at the onset of gross melt fracture for the preferred substantially linear ethylene polymers used in the invention, especially those having a density less than 0.910 g/cc, is greater than $4 \times 10^6$ dynes/cm². In one aspect, the critical shear rate at the onset of surface melt fracture (OSMF) and the onset of gross melt fracture (OGMF) will be used herein based on the changes of surface roughness and configurations of the extrudates extruded by a GER.

In another aspect, the preferred homogeneously branched ethylene polymers used in the present invention can be characterized by a single DSC melting peak. In this aspect, the single melting peak can be determined using a differential scanning calorimeter standardized with indium and deionized water. The exemplary method involves 5-7 mg sample sizes, a "first heat" to about $140°$ C. which is held for 4 minutes, a cool down at $10°$ C./min to $-30°$ C. which is held for 3 minutes, and heat up at $10°$ C./min. to $150°$ C. for the "second heat". The single melting peak is taken from the "second heat" heat flow vs. temperature curve. Total heat of fusion of the polymer is calculated from the area under the curve.

In one aspect, for the preferred homogeneously branched ethylene polymers having a density of 0.86 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. In this aspect, the artifact can occur within $34°$ C., typically within $27°$ C., and more typically within $20°$ C. of the melting point of the single melting peak. The heat of fusion attributable to an artifact can be separately determined by specific integration of its associated area under the heat flow vs. temperature curve.

In yet another exemplary aspect, the molecular weight distribution ($M_w/M_n$) for the substantially linear ethylene polymers and homogeneous linear ethylene polymers used in the present invention is generally from about 1.8 to about 2.8. However, in another aspect, substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

In various aspects, the preferred homogeneously branched ethylene polymers present in the adhesive composition of the present invention (whether present as a virgin polymer, a recycled polymer, or a combination thereof) can comprise interpolymers of ethylene and at least one α-olefin prepared by a solution, gas phase or slurry polymerization process or combinations thereof. In one example and not meant to be limiting, suitable α-olefins are represented by the following formula $CH_2=CH-R$ where R is a hydrocarbyl radical. Further, R may be a hydrocarbyl radical having from one to twenty carbon atoms and as such the formula includes $C_3$-$C_{20}$ α-olefins. Exemplary α-olefins for use as comonomers can comprise propylene, 1-butene, 1-isobutylene, 1-pentene, 1-hexene, 4-methyl-1-pentene, 1-heptene and 1-octene, as well as other comonomer types such as, for example and without limitation, styrene, halo- or alkyl-substituted styrenes, tetrafluoro-ethylene, vinyl benzocyclobutane, 1,4hexadiene, 1,7-octadiene, and cycloalkenes, e.g., cyclopentene, cyclohexene and cyclooctene. Preferably, the comonomer will be 1-butene, 1-pentene, 4-methyl-1-pentene, 1-hexene, 1-heptene, 1-octene, or mixtures thereof, as adhesive backing materials comprised of higher α-olefins will have especially improved toughness. However, most preferably, the comonomer will be 1-octene and the ethylene polymer will be prepared in a solution process.

In an aspect of the invention, the preferred ethylene polymers for use in the present invention have a relative low modulus. That is, the ethylene polymer can be characterized as having a 2% secant modulus less than 24,000 psi (163.3 MPa), especially less than 19,000 psi (129.3 MPa) and most especially less than 14,000 psi (95.2 MPa), as measured in accordance with ASTM D790. Additionally, the preferred ethylene polymers for use in the present invention are substantially amorphous or totally amorphous. That is, the ethylene polymer is characterized as having a percent crystallinity less than 40 percent, preferably less than 30 percent, more preferably less than 20 and most preferably less than 10 percent, as measured by differential scanning calorimetry using the equation percent crystallinity=$H_f/292*100$, where $H_f$ is the heat of fusion in Joules/gram.

In another aspect, it should be understood that either the recycled polymer portion or the virgin polymer portion of the adhesive composition can comprise the preferred homogeneously branched ethylene polymer blended together with one or more synthetic or natural polymeric materials. For example and not meant to be limiting, suitable polymers for blending or mixing with homogeneously branched ethylene polymers used in the present invention can comprise another homogeneously branched ethylene polymer, low density polyethylene, heterogeneously branched LLDPE, heterogeneously branched ULDPE, medium density polyethylene, high density polyethylene, grafted polyethylene (e.g., a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polybutylene, polycarbonate, ethylene propylene polymers, ethylene styrene polymers, and styrene block copolymers.

In another aspect of the present invention, the recycled polymer portion or the virgin polymer portion of the adhesive composition can comprise a modified homogeneously branched ethylene polymer. In particular, in certain aspects of the invention the at least one homogeneously branched ethylene polymer that can be present within the virgin polymer portion or the recycled polymer portion of the adhesive composition can be modified by the addition of at least one adhesive polymeric additive. Suitable adhesive polymeric additives include, for example and without limitation, polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic α-olefin monomers, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

A modified homogeneously branched ethylene polymer for use in the virgin polymer portion of the adhesive composition can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of all of which are incorporated herein by reference. Further, it should be understood that the presence of the foregoing adhesive polymer additives, whether individually or as a part of a modified homogeneously branched ethylene polymer is due to the presence of these polymers and polymer additives in the initial post consumer carpet that was recycled as described herein to provide the recycled polymer portion of the adhesive composition.

Preferred adhesive polymeric additives for use in the present invention include maleic anhydride grafts wherein maleic anhydride is grafted onto an ethylene polymer at a concentration of about 0.1 to about 5.0 weight percent, preferably about 0.5 to about 1.5 weight percent. The presence of ethylene polymer/maleic anhydride grafts as adhesive polymeric additives in the present invention can improve the performance and operating window of extrusion coated homogeneously branched ethylene polymers as the adhesive backing material, especially when used in connection with polar polymers such as for example, but not limited to, nylon and polyester faced carpets. The improvement pertained to substantially higher comparative abrasion resistance and tuft bind strength. In an exemplary aspect, a preferred composition for forming a maleic anhydride graft is the Amplify® GR 204 available from Dow Chemicals.

Preferred ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. Preferred host ethylene polymers have a polymer density greater than or equal to 0.86 g/cc, 0.87 g/cc, 0.88 g/cc, 0.89 g/cc, 0.90 g/cc, 0.91 g/cc, 0.92 g/cc, 0.93 g/cc, or even most preferably greater than or equal to 0.94 g/cc. Substantially linear ethylene polymers and high density polyethylene are the preferred host ethylene polymers.

The actual blending or mixing of various polymers of the adhesive backing, including the blending of the recycled polymer portion and the optional virgin polymer portion can be conveniently accomplished by any technique known in the art including, but not limited to, melt extrusion compounding, dry blending, roll milling, melt mixing such as in a Banbury mixer, twin screw extruder, and multiple reactor polymerization.

It will be appreciated that it is contemplated that the adhesive composition to be extruded onto the greige good can either be used neat, or can have one or more additive included. In this aspect, the adhesive composition of this invention may optionally include exemplary additives such as foaming agents, pH controllers, flame retardants, fillers, tackifiers, wetting agents, dispersing agents, anti-microbial agents, lubricants, dyes, anti-oxidants, and the like, which are well known to those skilled in the art, without loss of the characteristic properties.

In one aspect, the adhesive composition further comprises one or more flame retardants sufficient to ensure the carpet structure satisfies the requirements of the radiant flux floor covering test according to the ASTM-E648 testing procedures. In particular, according to certain aspects, the carpet structures of the present invention exhibit a Class 1 critical radiant flux of greater than 0.45 watts per $cm^2$ as measured according to ASTM-E648. According to other aspects of the invention, the carpet structures described herein can exhibit a Class 2 critical radiant flux in the range of from 0.22 to 0.44 watts per $cm^2$ as measured according to ASTM-E648. In still further aspects, the carpet structures of the present invention can exhibit an unclassifiable critical radiant flux of less than 0.22 watts per $cm^2$ as measured according to ASTM-E648.

Exemplary flame retardants that can be incorporated into the adhesive backing compositions of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the adhesive compositions of the instant invention and the selection of such amount will depend, in part, upon the particular flame retardant used, as well as the desired level of flame retardance to be achieved in the second generation carpet being manufactured. Such amounts can be readily determined through no more than routine experimentation.

Exemplary and non-limiting fillers that can be incorporated into the adhesive backing composition of the present invention can include calcium carbonate, flyash, residual by products from the depolymerization of Nylon 6 (also referred to as ENR co-product), recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In one preferred aspect, the recycled adhesive composition comprises inorganic filler with high heat content. In some aspects, it is preferred for the filler to exhibit relatively high heat content. Examples of such fillers include, but are not limited to, calcium carbonate, aluminum trihydrate, talc, and barite. The exemplified high heat content fillers allow the extrudate to remain at elevated temperatures longer with the beneficial result of providing enhanced encapsulation and penetration. In this aspect, the high heat content fillers should be ground or precipitated to a size that can be conveniently incorporated in an extrusion coating melt stream. Exemplary non-limiting particle sizes for the inorganic filler material can include particle sizes in the range of from about 1 to about 50 microns. Still further, it should also be understood that the filler component can be present in any desired amount. However, in an exemplary aspect, the filler is present in an amount in the range of from 25 weight % to 90 weight %, based upon the total weight of the adhesive composition, including exemplary amounts of 30 weight %, 35 weight %, 40 weight %, 45 weight %, 50 weight %, 55 weight %, 60 weight %, 65 weight %, 70 weight %, 75 weight %, 80 weight %, and 85 weight %. Still further, the amount of filler present can be in any range derived from any two of the above stated weight percentages.

In still another aspect, the adhesive composition can further comprise one or more tackifying additives. The tackifier can for example be tall oil or rosin based or, alternatively, can be an aliphatic or aliphatic aromatic hydrocarbon blend resin. In an exemplary aspect, the tackifier can be a hydrocarbon tackifier such as the Piccotac 1115 tackifier available from Eastman Chemical Company, Kingsport, Tenn., USA. As the tackifier is an optional component, the amount of tackifier can be, when present, in the range of from greater than 0 weight percent up to and even exceeding 50 weight percent of the adhesive composition. For example, in one aspect, the amount of tackifier can be in the range of from 5 weight percent to 45 weight %. In still another aspect, the amount of tackifier can be in the range of from 10 weight % to 20 weight %.

In still another aspect, the adhesive backing can be a foamed adhesive backing. To that end, if a foamed backing is desired on the carpet, a blowing agent can be added to the adhesive backing material and/or the optional secondary backing material. If used, the blowing agents are preferably conventional, heat activated blowing agents such as, without limitation, azodicarbonamide, toluene sulfonyl semicarbazide, and oxy bis(benzene sulfonyl) hydrazide. In this aspect, it is contemplated that the selected implosion agent is formulated into the adhesive backing material and the extrusion conditions are set such that the activation of the implosion agent occurs at the instant of nip while the adhesive backing material is still semi-molten or molten. With improved yarn penetration accomplished with the use of an implosion agent, the carpet will exhibit comparatively improved abrasion resistance. Thus, the use of an implosion agent can allow the use of polymer compositions having lower molecular weights to provide improved extrusion coatability yet maintain higher abrasion resistance (i.e., comparable to adhesive backing materials based on higher molecular weight polymer compositions).

Conventional blowing agents or any material that ordinarily functions as a blowing agent can be used as an implosion agent in the present invention providing expansion of the adhesive backing material matrix is suitably restricted or confined when the material is activated such that molten polymer is forced into the interior and free space of the yarn or fiber bundles and there is no substantial expansion of the adhesive backing material as a result of having used the implosion agent.

Still further, it should be understood that yet other additives can also be included in the adhesive backing material of the present invention, including for example and without limitation, antioxidants such as sterically hindered phenols, sterically hindered amines and phospites may be used. Suitable antioxidants can include, for example, a hindered phenol and a phosphite. Other possible additives include antiblock additives, pigments and colorants, anti-static agents, antimicrobial agents (such as quaternary ammonium salts) and chill roll release additives (such as fatty acid amides).

In still another broad aspect, the present invention also provides a method for manufacturing the carpets described herein. While, as noted, carpet and carpet tiles are separate aspects of the present invention, the basic structure of the face fabric of these aspects are not critical to the invention and, as such, will be discussed together.

In a first aspect of the present invention, a face fabric is provided. The face fabric can be either a tufted greige good, a fusion bonded material or a woven and needle punched material. Whether a tufted greige good, a fusion bonded or a woven and needle punched face fabric is used, the face yarns may be made from synthetic fibers such as, for example and without limitation, polyolefins, polyamides, polyesters, polyethylene terephthalate (PET), polypropylene, and polytrimethylene terephthalate (PTT). Still further, the face yarns can be comprised of natural fibers such as staple rayon fibers, cellulose fibers, cotton fibers, viscose, and combinations thereof. In a particularly preferred aspect, the face yarns are comprised of polypropylene. In another preferred aspect, the face yarns are comprised of nylon fibers.

To prepare a greige good, a yarn is tufted, woven or needle punched into a primary backing. The tufting, weaving or needle punching can be conducted in any manner known to be suitable to one of ordinary skill in the art which will not be discussed in detail herein. To fix the yarn to the primary backing, an adhesive material is applied to the back of the fabric. In one aspect of the present invention, the adhesive material applied to the back side of the fabric is comprised of a recycled adhesive backing composition as described herein. However, in an alternative aspect, and as described in more detail below, a pre-coat layer can first be applied to the backside of the fabric in order to fix the yarn to the primary backing prior to applying the recycled adhesive backing material of the present invention.

In the present invention, a woven or a non-woven primary backing material can be used. The type of primary backing desired will depend on various factors including, but not limited to, whether broadloom carpet, carpet tile, or an area rug is being made, the desired end-use for the product (e.g., commercial or residential), the type of face yarn used and the price of the product. One example of a suitable woven primary backing is 24×18 woven primary, style no. 2218 from Propex, Inc. One example of a suitable non-woven backing material is Colbond UMT 135, manufactured by Colbond, Enka, N.C. Other types of primary backings are also suitable for use herein such as, for example, hydraentangled fibers and fiberglass.

A fusion bonded face fabric is characterized by a plurality of cut pile yarns, for example, nylon or other natural or synthetic fibrous-type material, implanted in an adhesive layer, particularly a thermoplastic, like a polyvinyl chloride layer or a hot-melt adhesive layer. Where a polyvinyl chloride plastisol layer is used, heating of the layer gels and then fuses the layer into solid form, while with hot-melt adhesive material, a melted layer is applied and subsequently cooled into solid form. The plurality of fibrous yarns are bonded to and extend upright from the adhesive base layer to form a face wear surface. Methods of making fusion bonded face goods are known and described, for example, in U.S. Pat. No. 6,089,007, the disclosure of which is incorporated in its entirety by this reference.

In another aspect, any conventional tufting or needle-punching apparatus and/or stitch patterns can be used in the carpet of the present invention. Likewise, it does not matter whether tufted yarn loops are left uncut to produce a loop pile; cut to make cut pile; or cut, partially cut and uncut to make a face texture known as tip sheared. After the yarn is tufted or needle-punched into the primary backing material, the greige good can be conventionally rolled up with the back side of the primary backing material facing outward and held until it is transferred to the backing line.

In one exemplary embodiment, the greige good can be scoured or washed before it has an adhesive backing material extruded thereon to remove or displace all or substantially all of the processing materials, such as for example oily or waxy chemicals, known as spin-finish chemicals, that remain on the yarn from the yarn manufacturing processes. It is also contemplated that the use of polyolefin waxes (rather than conventional organic and mineral oils) as processing materials would allow improved adhesive backing material performance in itself or at least minimize the use of scouring or washing methodologies.

As noted, according to some aspects of the invention, the greige good can optionally be coated with a pre-coat material (not shown) before the adhesive backing material is extruded thereon. The aqueous pre-coat material can, for example, be added as a dispersion or as an emulsion. In an exemplary aspect, an emulsion can be made from various polyolefin materials such as, for example and without limitation, ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). It is further contemplated that the pre-coat material can be selected from a group comprising, without limitation, an EVA hotmelt, a VAE emulsion, carboxylated styrene-butadiene (XSB) latex copolymer, a SBR latex, a BDMMA latex, an acrylic latex, an acrylic copolymer, a styrene copolymer, butadiene acrylate copolymer, a polyolefin hotmelt, polyurethane, polyolefin dispersions and/or emulsions, and any combination thereof.

When used, the pre-coat can further comprise one or more flame retardants. Exemplary flame retardants that can be incorporated into the optional pre-coat layer include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the precoat and the selection of such amount will depend, in part, upon the particular flame retardant used, as well as the desired level of flame retardance to be achieved in the second generation carpet being manufactured. Such amounts can be readily determined through no more than routine experimentation.

In still a further aspect, the precoat can preferably contain other ingredients. For example, a surfactant can be included to aid in keeping the polyolefin particles at least substantially dispersed. Suitable surfactants can include, for example and without limitation, nonionic, anionic, cationic and fluorosurfactants. Preferably, the surfactant is present in an amount between about 0.01 and about 5 weight percent based on the total weight of the emulsion or dispersion. More preferably, the surfactant is anionic.

In another example, the pre-coat can further comprise a thickener, a defoaming agent, and/or a dispersion enhancer. In this aspect, the thickener helps to provide a suitable viscosity to the dispersion. For example, the thickener can exemplarily comprise sodium and ammonium salts of polyacrylic acids and best present in an amount between about 0.1 and about 5 weight percent based on the total weight of the dispersion. The defoaming agent can, without limitation, be a non-silicone defoaming agent and is present in an amount between about 0.01 and about 5.0 weight percent based on the total weight of the dispersion. An exemplified dispersion enhancer can be a fumed silica that acts as a compatibilizer for the dispersion, which allows for the use of larger polyolefin particles. Preferably, the fumed silica is present at between about 0.1 and about 0.2 weight percent based on the total weight of the dispersion.

In still another aspect, the pre-coat can comprise one or more fillers. Exemplary and non-limiting fillers that can be incorporated into the adhesive backing composition of the present invention can include calcium carbonate, flyash, residual by products from the depolymerization of Nylon 6 (also referred to as ENR co-product), recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof.

The pre-coat can be applied to the carpet in various ways. For example, the dispersion can be applied directly, such as with a roll over roller applicator, or a doctor blade. Alternatively, the pre-coat can be applied indirectly, such as with a pan applicator. It is contemplated that the amount of pre coat applied and the concentration of the particles in the pre-coat can be varied depending on the desired processing and product parameters. In one example, the amount of dispersion applied and the concentration of the particles are selected so as to apply between about 4 and about 12 ounces per square yard (OSY).of carpet. In one aspect, this can be achieved by using a dispersion or emulsion containing about 50 weight percent polyolefin particles (based on the total weight of the emulsion) and applying between about 8 and about 30 OSY of the dispersion. Accordingly, it should be understood that desired application weight of the pre-coat will depend, at least in part, upon the presence and amount of inorganic fillers and/or flame retardants in the pre-coat. In an exemplary aspect, a preferred a latex precoat is the LXC 807 NA from Dow Chemicals.

After application of the pre-coat, heat can be applied to the back side of the primary backing so as to dry, melt, and/or cure the emulsion. As a result, the loops of yarn can be at least partially fixed to the primary backing. Preferably, the heat is applied by passing the product through an oven.

After treatment with the optional pre-coat emulsion of polyolefin particles, additional backing material can be applied thereto. The additional backings can be applied by various methods with the preferred method involving the use of an extruded sheet of a thermoplastic material, preferably the recycled adhesive backing composition as described above, onto which a conventional secondary backing can also be laminated. In particular, a molten thermoplastic material is preferably extruded through a die so as to make a sheet which is as wide as the carpet. The molten, extruded sheet is applied to the back side of the primary carpet backing. Since the sheet is molten, the sheet will conform to the shape of the loops of yarn and further serve to encapsulate and fix the loops in the primary backing. In aspects where a pre coat has been applied to the back side of the greige good, it will be understood that the pre-coat is disposed between the adhesive backing composition and the back side of the greige good. Alternatively, according to aspects where the optional pre coat layer is not applied, the recycled adhesive backing composition of the present invention is applied directly on the back side of the primary backing and can, itself, serve to fix the loops in the primary backing.

Exemplary extrusion coating configurations can include, without limitation, a monolayer T-type die, single-lip die coextrusion coating, dual-lip die coextrusion coating, a coat hanger die, and multiple stage extrusion coating. Preferably, the extrusion coating equipment is configured to apply a total coating weight of from about 4 to about 60 ounces/yd$^2$ (OSY), including exemplary amounts of 5, 10, 15, 20, 25, 30, 35, 40, 45, 50 and 55 ounces/yd$^2$ (OSY), and any range of coating weights derived from these values. To that end, it should be understood that the desired coating weight of the extrusion coated layers will depend, at least in part, upon the amount of any flame retardants or inorganic fillers in the extrudate.

The extrusion coating melt temperature principally depends on the particular composition of the adhesive backing composition being extruded. When using the recycled adhesive backing composition described above, comprising the preferred substantially linear polyethylene described above, the extrusion coating melt temperature can be greater than about 350° F. and, in some aspects, in the range of from 350° F. to 650° F. In another aspect, the melt temperature can be in the range of from 375° F. to 600° F. Alternatively, the melt temperature can be in the range of from 400° F. to 550° F. Still further, in aspects of the invention the melt temperature can be in the range of from 425° F. to 500° F.

Figure 4:
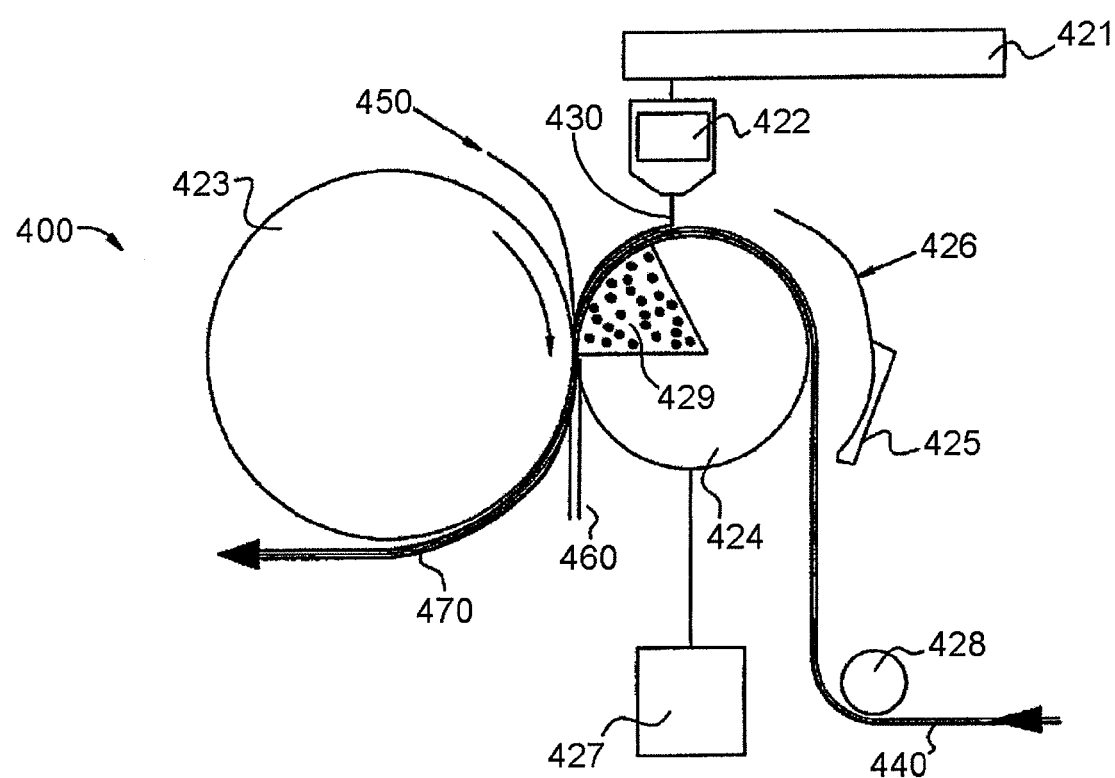
FIG. 4 is a schematic representation of an exemplary extrusion coating line according to one aspect of the invention.

FIG. 4. shows an exemplary line 400 for applying a recycled adhesive backing composition as described herein to the back side of a greige good to provide an adhesive backed carpet 470. As shown, the line 400 includes an extruder 421 equipped with a slot die 422, a nip roll 424, a chill roll 423, an exhaust hood 426, a turn roll 428 and a pre-heater 425. As illustrated, the nip roll is preferably equipped with a vacuum slot 429 to draw a vacuum across about a portion of its circumference and is configured in communication with a vacuum pump 427. The slot die 422 is configured to dispense the recycled adhesive backing material in the form of a semi-molten or molten polymer sheet 430 onto greige good 440 with the polymer sheet 330 being oriented towards the chill roll 423 and the greige good 440 being oriented towards the optional vacuum nip roll 424. As further illustrated, an optional secondary backing material 450 can be applied onto the polymer sheet 430. The point where the nip roll 424 and the chill roll 423 are closest to one another is referred to as the nip 460.

It is further contemplated according to aspects of the present invention that a plurality of two or more separate layers or applications of a recycled adhesive backing composition of the present invention can be applied to the backside of a greige good. For example, in aspect where the optional pre-coat as described above has not been applied, it can be desirable to apply a first layer of the recycled adhesive backing composition to first fix the yarn loops to the primary backing, followed by a subsequent application of a recycled adhesive composition of the instant invention. To that end, it is contemplated that a carpet with two layers of extruded recycled adhesive backing can be made with a single extrusion die, nip roll and chill roll similar to that depicted in FIG. 4. In particular, a first layer of extruded backing can be applied in a first pass through the line after which the carpet is rolled up. The second layer of extruded backing can then be applied on top of the first layer in a second pass through the same line.

According to aspect having two or more extruded layers of the recycled adhesive backing composition, the two layers can optionally be comprised of the same adhesive backing composition or, alternatively, can optionally each be a layer comprising a different adhesive backing composition. For example, a first layer can be applied directly onto the backside of the primary backing material (first layer) having a higher melt index than the second layer which is applied onto the backside of the first layer. In this aspect, since it is the first layer which is relied on to encapsulate and penetrate the yarn, this layer should have a melt index high enough (melt viscosity low enough) to promote encapsulation and penetration of the yarn. The second layer, which is generally not relied on to encapsulate and penetrate the yarn, may be used either as the bottom surface of the carpet or to facilitate the application of an optional secondary backing material. In this example, it can be preferred to have a lower melt index to provide higher strength after cooling. Further, a resin of lower quality and/or less tightly controlled properties may be used in the second layer because it is not relied on for encapsulating or penetrating the fiber bundles. In a preferred embodiment, the second layer can be formed from a recycled adhesive composition. In this aspect, it is contemplated that the first and second layers can consist of different polymer chemistries or compositions.

In still another aspect, two or more layers of a single polymer composition can be extruded to provide greater control over the thickness or weight of the adhesive backing applied to the carpet. Still further, in alternative embodiments, three or more layers of the adhesive backing composition can be extruded on the back surface of the primary backing material to achieve even higher coat weights and/or to obtain a more gradual transition between the first and last layer applied. In this aspect, a dual lip die can be used to apply two layers. Alternatively, two or more extrusion stations or a single lip coextrusion die can be used to apply these two or more layers.

Figure 5:
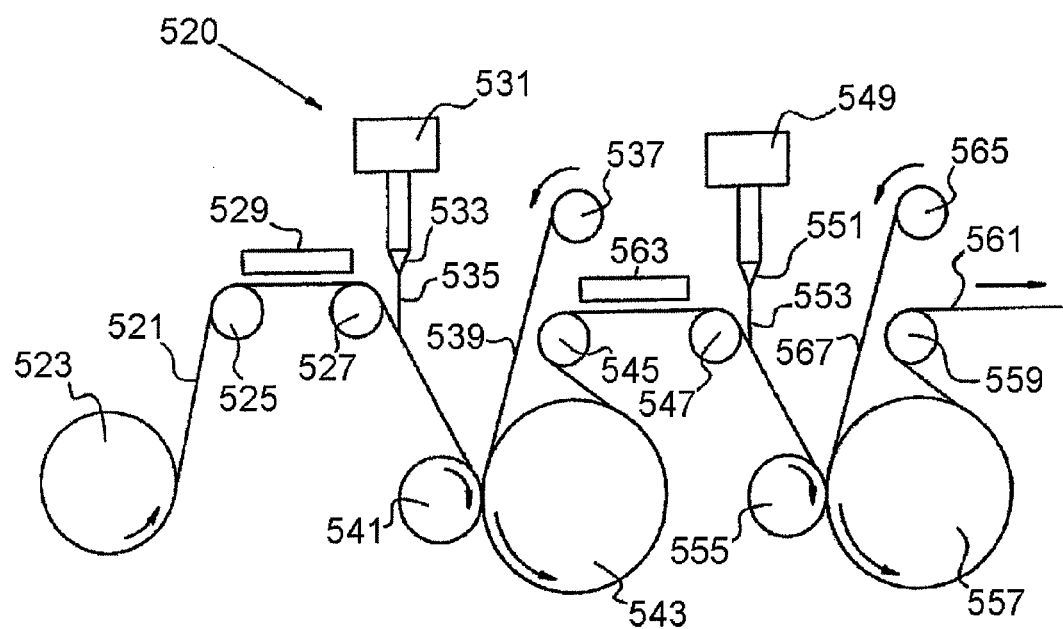
FIG. 5 is a schematic representation of an exemplary extrusion coating line according to an aspect of the invention.

In still another aspect, it can also be desired to apply a reinforcing layer to the adhesive backing layer of the carpet. The reinforcing layer can, for example, add dimensional stability to those aspects of the invention that are intended for use as carpet tiles. To that end, any conventional reinforcing material can be used, including woven and non-woven fiberglass or polypropylene scrims and the like. In a preferred aspect, the scrim can be applied in between two or more layers of the recycled adhesive backing composition. For example, FIG. 5 schematically shows an exemplary line 520 for manufacturing a carpet according to aspects of the present invention. As shown, a length of greige good 521, i.e., yarn tufted into a primary backing, is unrolled from the roll 523. The greige good 521 passes over the rollers 525 and 527 with the primary backing toward a pre-heater 529. The pre-heater, such as a convection oven or infrared panels, can be used to heat the back of the greige good before the adhesive backing material is extruded thereon to enhance the encapsulation and penetration of the yarn bundles. In addition to or as an alternative to pre-heating, the process of the invention may also employ a post-heat soaking process step to lengthen the molten time for the adhesive backing material to thereby improve the encapsulation and penetration of the yarn or fiber bundles by the adhesive backing material.

An extruder 531 is mounted so as to extrude a first sheet 535 of the recycled adhesive backing composition through the die 533 and onto the back of the greige good at a point between the roller 527 and the nip roll 541. The exact location at which the sheet 535 contacts the greige good can be varied depending on the line speed and the time desired for the molten polymer to rest on the greige good before passing between the nip roll 541 and the chill roll 543. In this depicted embodiment, a scrim of non-woven fiberglass 539 can be fed from roll 537 so as to contact the chill roll 543 at a point just prior to the nip roll 541. As a result, the scrim 539 that will act as a reinforcing fabric in the finished carpet is laminated to the greige good through the polymer.

The desired pressure between the nip roll 541 and the chill roll 543, measured in pounds per linear inch (PLI) can be varied depending on the force desired to push the extruded sheet. In particular, this desired pressure can be adjusted by varying the pressure within the air cylinders. Alternatively, the nip roll 541 and chill roll 543 can be operated in a gap mode whereby the spacing between the two rolls can be adjusted to a desired gap width, depending for example on the thickness of the material being passed therebetween. Also, as described in connection with FIG. 4, it may be desirable to include a vacuum slot in the nip roll. In addition, a jet of pressurized air may also be used to push the extruded sheet into the carpet backing. Still further, the size of the chill roll 543 and the length of time the carpet rolls against it can be varied depending on the level of cooling desired in the process. Preferably, the chill roll 543 is cooled by simply passing ambient or chilled water through it.

After passing over the chill roll 543, the carpet is brought over rollers 545 and 547 with the carpet pile oriented toward the rollers and the backside of the carpet, having a first layer of adhesive 535 and a scrim 539 laminated thereto oriented toward a second pre-heater 563. A second extruder 549 extrudes a second sheet of a recycled adhesive backing composition 553 through its die 551 on to the back of the scrim 539. Again the point at which the extruded sheet 553 contacts the scrim 539 can be varied as described above.

At this point, if an optional secondary backing fabric 567 is desired for the carpet composition, that fabric can be introduced from a second roll 565 similar to that shown at 537 so as to be laminated to the carpet through the extruded sheet 553 as it passes between the nip roll 555 and the chill roll 557. Subsequently, the carpet passes between the nip roll 555 and the chill roll 557. Again, the pressure applied between the two rolls 555 and 557 can be varied as required. Finally, after passing around the chill roll 557, the finished carpet 561 passes around roll 559 and is preferably passed over an embossing roll (not shown) to print a desired pattern on the back of the carpet.

As noted above, the carpet of the invention can optionally include a secondary backing material. As shown in FIG. 4 and FIG. 5, the secondary backing material is preferably laminated directly to the extruded layer(s) while the extrudate is still molten after extrusion coating to improve the penetration of the extrusion coating into the primary backing. Alternatively, the secondary backing material can be laminated in a later step by reheating and/or remelting at least the outermost portion of the extruded layer or by a coextrusion coating technique using at least two dedicated extruders. Also, the secondary backing material can be laminated through some other conventional means, such as by interposing a layer of a polymeric adhesive material between the adhesive backing material and the secondary backing material. Suitable polymeric adhesive materials include, but are not limited to, ethylene acrylic acid (EAA) copolymers, ionomers and maleic anhydride grafted polyethylene compositions. The secondary backing material can be woven or non-woven and can further be comprised of one or more polyethylene polymers such as, for example and without limitation, a low density polyethylene (LDPE), heterogeneously branched linear low density polyethylene (LLDPE), high density polyethylene (HDPE), heterogeneously branched ultra low density polyethylene (ULDPE), heterogeneously branched very low density polyethylene (VLDPE), heterogeneously branched linear low density polyethylene (LLDPE), heterogeneously branched linear very low density polyethylene (VLLDPE), a copolymer of ethylene and alpha olefin, polypropylene, a copolymer of propylene and alpha olefin, a copolymer of propylene and ethylene, ethylene vinyl acetate copolymer (EVA), ethylene methyl acrylate copolymer (EMA), grafted polyethylene polymers (e.g., a maleic anhydride extrusion grafted heterogeneously branched linear low polyethylene or a maleic anhydride extrusion grafted homogeneously branched ultra low density polyethylene), ethylene acrylic acid copolymer, ethylene ethyl acrylate copolymer, polystyrene, polyolefin, polyester, polyurethane, polybutylene, polyamide, polycarbonate, rubbers, ethylene propylene polymers, ethylene styrene polymers, styrene block copolymers, and vulcanates.

Figure 6:
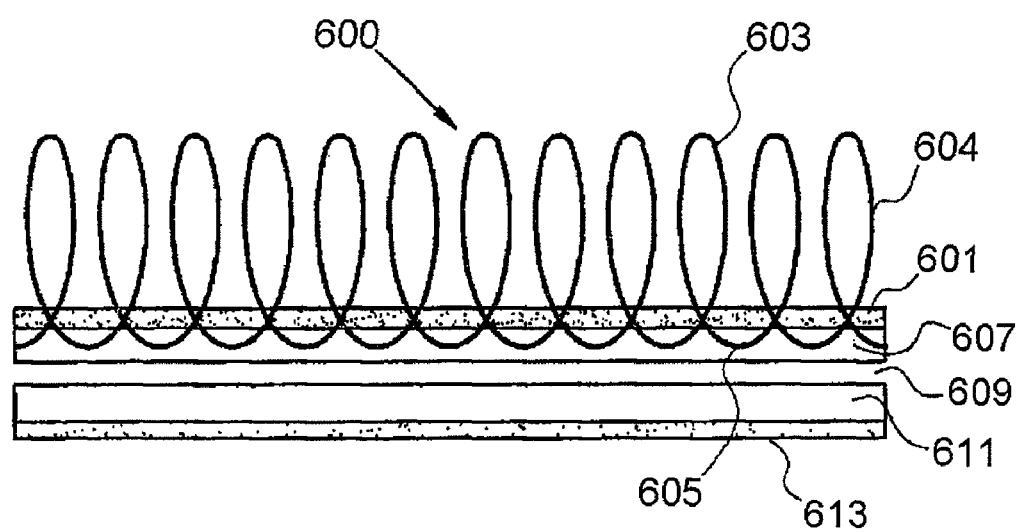
FIG. 6 is a schematic representation of an exemplary tufted carpet tile according to one aspect of the invention.

In still another aspect, the extrusion backed carpet construction and the methods described herein are particularly suited for making carpet tile. FIG. 6 shows an exemplary cross-section of a carpet tile 600 made according to the present invention. A face yarn 603 is tufted into a primary backing 601 so as to leave a carpet pile face 604 on top of the primary backing 601 and back stitches 605 below the primary backing. Applied to the back of the primary backing 601 and the back stitches 605 is a recycled adhesive composition layer 607 comprising at least one recycled polyolefin polymer component reclaimed from a process as described herein. In a preferred embodiment of carpet tile, the carpet includes from about 5 to about 200 OSY of extruded adhesive backing. More preferably, the carpet for tile includes from about 30 to about 80 OSY of extruded backing, most preferably, 50 OSY Preferably, the carpet tile receives its extruded adhesive backing in two passes as exemplified in FIG. 5 discussed above. The first pass applies the layer 607. Preferably this layer 607 is between about 2.5 and about 100 OSY of the extruded polymer, more preferably between about 15 and about 40 OSY, and most preferably 25 OSY. The second pass adds the layer 611. Preferably the second layer 611 is about 2.5 and about 100 OSY, more preferably between about 15 and 40 OSY, and most preferably 25 OSY.

When, for example, making carpet tile, it can again be preferable to embed a layer of reinforcing material 609 between the first and second layers of extruding backing. An important property of carpet tile is dimensional stability, i.e., the ability of the tile to maintain its size and flatness over time. The inclusion of this layer of reinforcing material has been found to enhance the dimensional stability of carpet tile made according to this preferred embodiment. Suitable reinforcing materials include dimensionally and thermally stable fabrics such as non-woven or wet-laid fiberglass scrims, as well as woven and non-woven thermoplastic fabrics (e.g. polypropylene, nylon and polyester). Most preferably, the reinforcement layer is a polypropylene non-woven fabric sold by Reemay as "Typar" with a basis weight of 3.5 OSY. Alternatively, a preferred reinforcement layer is a fiberglass scrim sold by ELK Corp. as "Ultra-Mat" with a basis weight of 1.4 OSY.

The carpet tile may include a secondary backing fabric 613 below the second layer of extruded backing 611. Suitable materials for the secondary backing fabric include those described above.

One skilled in the art will appreciate that, notwithstanding the particular examples described above, it is contemplated that the carpet may be produced by the processes known to those of skill in the art, including but not limited to direct coating and roll metering, and knife-coating and lick-roll application, as described in D. C. Blackly, *Latex and Textiles*, section 19.4.2, page 361, which is incorporated herein by reference.

EXAMPLES

To further illustrate the principles of the present invention, the following examples are put forth so as to provide those of ordinary skill in the art with a complete disclosure and description of how the various aspects of the invention disclosed herein can be made and/or evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric or full vacuum.

Example 1

Evaluation of Melt Flow Ratio and Reclamation for Control Samples

A series of experiments were performed to evaluate the melt flow ratio and recyclability of exemplary adhesive components. These melt flow ratios were then compared to the melt flow ratios of an exemplary virgin adhesive composition. Without intending to be bound by theory, it is believed that melt flow ratio can, in one aspect, be indicative of the processing characterstics of a polymeric adhesive composition and therefore a correlation or similarity in the measured melt flow ratios can, in one aspect, be indicative of the ability for a recycle adhesive composition according to the present invention to be utilized in preparing a second generation carpet composition.

Initially, a control sample comprised of virgin adhesive components was evaluated for its melt flow processing characteristics. The control sample was a polymeric adhesive composition comprised of approximately 75 weight percent of an Affinity® series substantially linear ethylene polymer from Dow Chemicals, approximately 20 weight percent of a hydrocarbon tackifier resin (Piccotac 1115 from Eastman Chemical), and 5 weight % of an adhesive modifier (GR 204 from Dow Chemical). Five samples of the control composition were tested according to ASTM D1238-04C and the resulting data are set forth in Table 1 below:

TABLE 1

| Melt Flow Ratio of Virgin Control Samples | |
|---|---|
| Control 1 | 58.36 g/10 min |
| Control 2 | 59.89 g/10 min |
| Control 3 | 55.12 g/10 min |
| Control 4 | 48.02 g/10 min |
| Control 5 | 46.52 g/10 min |
| Average | 53.58 g/10 min |

The control adhesive composition, comprised of virgin adhesive components as set forth above, was then evaluated for its ability to be dissolved in a terpene solvent system and subsequently reclaimed pursuant to the method of the instant invention. The recycling method comprised preheating a vacuum oven to approximately 200 degrees Celsius. A sample of the extruded control virgin adhesive layer was obtained and subsequently size reduced to polymer chips less than approximately 0.25 inches in size.

Using a round-bottomed 250 ml flask, approximately 60.0 grams of D-Limonene and 6.0 g of polymer chips were combined. A magnetic stir bar was then added to the flask for mechanical agitation. Prior to heating the sample, the air in the flask was purged with a $CO_2$ gas stream. After which, the sample was heated with the $CO_2$ blanket in place. A round-bottomed heating mantle was used to evenly distribute heat to the liquid sample. The stir bar was activated at a medium agitation level to keep the polymer chips moving off of the glassware during heating. The sample was heated slowly until nearly boiling and the chips were allowed to dissolve into solution.

As the $CO_2$ blanket was pushed out of the container by D-limonene vapor, a condenser and solvent recovery apparatus was connected to collect the distilled D-limonene from the flask. The sample continued to heat slowly while the majority of the D-limonene distilled. The heat was gradually increased as the volume of liquid dropped being careful not to superheat to speed up the process. The dissolved polymer composition was devolatilized until the stirbar nearly or completely stopped spinning due to the viscosity increase resulting from the solvent removal. Once no more solvent was being devolatilized, the heat source was removed.

After removal of the heat, the flask was again filled with $CO_2$ gas to prevent oxidation of the sample and then sealed with a stopper. The sample was allowed to cool under ambient conditions until the glassware could safely be handled. Once cool, the recovered polymer was scraped out of the glassware and place into a PTFE-coated watch glass (6" diameter). The polymer-filled PTFE watch glass was then placed in the preheated vacuum oven under a Nitrogen blanket. The vacuum pump was engaged and the nitrogen purge was run for approximately 30 seconds. After which, the nitrogen valve was closed and the vacuum pump was run in order to reach approximately 29.5" or greater vacuum pressure.

The sample was allowed to dwell, under full vacuum pressure, at 200 C for 16 hours. This vacuum drying removed the residual solvent that was contained in the recovered polymer and that typically cannot be removed in atmospheric distillation conditions. Once the vacuum drying was complete, the oven chamber was again filled with $N_2$ until the vacuum pressure was released. The sample was then removed from the oven and allowed to cool in ambient conditions.

Once the recovered polymer sample was cooled, nine samples of the recovered control polymer composition were again tested for its Melt Flow Rate properties using the same method as the control. The resulting melt flow rates are set forth in Table 2 below.

TABLE 2

| Melt Flow Properties of Reclaimed Control Sample | |
|---|---|
| Recovered Control Sample 1 | 46.52 g/10 min. |
| Recovered Control Sample 2 | 49.72 g/10 min. |
| Recovered Control Sample 3 | 47.79 g/10 min. |
| Recovered Control Sample 4 | 49.16 g/10 min. |
| Recovered Control Sample 5 | 53.11 g/10 min. |
| Recovered Control Sample 6 | 48.48 g/10 min. |
| Recovered Control Sample 7 | 51.72 g/10 min. |
| Recovered Control Sample 8 | 53.48 g/10 min. |
| Recovered Control Sample 9 | 59.68 g/10 min. |
| Average of Recovered Samples 1-9 | 51.07 g/10 min. |

When compared to the initial melt flow characteristics of the virgin control samples set forth in Table 1 above, the results of the melt flow rates for the recovered control samples indicate that the recovered polymer from the extruded adhesive layer would have similar processing characteristics to that of virgin adhesive composition.

Additionally, a mass balance and polymer quality study was performed to determine the residual level of any solvent remaining in the recovered polymer. In particular, pursuant to the control samples set forth above, it was determined that at 200 degrees C., at a dwelling time of about 16 hours and under 29.5" of vacuum, the control polymer samples were able to achieve an exemplified residual level of solvent in the range of from approximately 0% to 0.26%. The data obtained and used for this determination is set forth in Table 3 below.

TABLE 3

| Sample # | Starting Mass | Final Mass | Residual |
|---|---|---|---|
| Control 1 | 5.04 grams | 5.04 grams | 0% |
| Control 2 | 5.01 grams | 5.07 grams | 0.12% |
| Control 3 | 5.04 grams | 5.17 grams | 0.26% |

Example 2

Exemplary Adhesive Reclamation from Actual Carpet Composition

The method of the instant invention was evaluated for its ability to reclaim polymeric materials from an actual carpet composition. A series of eleven reclamation experiments were conducted on a carpet composition that was a tufted broadloom carpet construction having a total material weight of approximately 57.92 oz/sy, including a total yarn weight of approximately 26.6 oz/sy and a total polymer weight of approximately 31.32 oz/sy. The yarn was a nylon yarn, tufted into a polypropylene primary backing having a weight of approximately 3.2 oz/sy. A latex precoat, LXC 807 NA from Dow Chemicals was applied to the primary backing in an amount of approximately 5.16 oz/sy. A virgin adhesive composition as described above in reference to the control sample was applied to the primary backing in an amount of approximately 19.24 oz/sy. A non-woven polypropylene secondary backing was also applied, having a total weight of approximately 3.68 oz/sy.

Pursuant to this example, a vacuum oven was again preheated to 200 degrees Celsius. The carpet described above was size reduced to into approximately ~½"×½" pieces. Using a round-bottomed 250 ml flask, approximately 6.00 grams of the sized reduced carpet pieces and approximately 60.00 grams of D-Limonene were combined. A magnetic stir bar was also added for mechanical agitation. The "air" in the flask was purged using CO2 gas prior to heating the sample. The sample was heated with the CO2 blanket in place, using a round-bottomed heating mantle to evenly distribute heat to the liquid sample. The stir bar was then engaged to a medium agitation level to keep the carpet pieces moving off of the glassware during heating. The sample was slowly heated until it nearly boiled, allowing the sample to dissolve into the solvent.

Once the non-nylon components of the carpet had dissolved into the D-Limonene solution, the flask was removed from the heating mantle. A mesh screen material (60 mesh) was then cut to fit a Buchner funnel. Once the mesh filter was placed in the Buchner funnel, the funnel was placed over an empty round bottomed flask. The dissolved polymer mixture, liquid, yarn, etc. was then filtered through the Buchner funnel and screen to collect the polymer solution and to separate the non-dissolved components, such as the nylon yarn. The collected yarn was then washed three times in boiling D-limonene to collect the residual polymer coated on the yarn. This D-Limonene can be recombined with the main polymer solution filtrate for devolatilization to achieve higher polymer yield overall.

The collected polymer solution in the flask was again placed back onto the heating mantle to devolatilize. The air was also purged from the flask again using $CO_2$ gas prior to re-heating the sample. With the $CO_2$ blanket in place, the sample was again heated to nearly boiling. When the $CO_2$ blanket began to push out of the container by the D-limonene vapor, a condenser and solvent recovery apparatus was connected to the flask to collect the distilled D-limonene from the flask. The sample was heated slowly while the majority of the D-limonene distilled out of the flask and the heat was gradually increased as the volume of liquid in the flask reduced. This was continued until the stir bar nearly or completely stopped spinning due to the viscosity increase and solvent removal. Once no more solvent was being devolatilized, the heat source was removed. Utilizing the same or similar process described above in connection with the control sample, the recovered polymer components were cooled and vacuum dried to at least substantially remove remaining residual solvent from the sample.

Once the recovered polymer samples were cooled, the recovered polymer compositions were tested for Melt Flow Rate properties. The resulting melt flow rates are set forth in Table 4 below:

TABLE 4

Melt Flow Properties of Reclaimed Samples 1-8

| | |
|---|---|
| Recovered Sample 1 | 65.79 g/10 min. |
| Recovered Sample 2 | 53.96 g/10 min. |
| Recovered Sample 3 | 46.04 g/10 min. |
| Recovered Sample 4 | 45.60 g/10 min. |
| Recovered Sample 5 | 40.74 g/10 min. |
| Recovered Sample 6 | 41.22 g/10 min. |
| Recovered Sample 7 | 40.56 g/10 min. |
| Recovered Sample 8 | 41.42 g/10 min. |
| Average of Recovered Samples 1-8 | 46.92 g/10 min. |

When compared to the initial melt flow characteristics of the virgin control samples set forth in Table 1 above, the results of the melt flow rates for these recovered samples indicate that the recovered polymer from the actual carpet composition exhibits similar processing characteristics to that of virgin adhesive composition and can therefore be used as a recycled component in a second generation adhesive composition.

Utilizing the same experimental procedures set forth above in Example 2, the melt flow properties of three additional samples were measured to evaluate the reproducibility and reliability of the melt flow properties achieved for polymer compositions reclaimed from the actual carpet samples. The melt flow rates of the three additional samples were each measured four separate times (A-D) and according to the procedures of ASTM D1238-04C. The melt flow data for these additional three samples are set forth in TABLE 5 below:

TABLE 5

Melt Flow Properties of Reclaimed Samples 9-11

| | |
|---|---|
| Recovered Sample 9-A | 44.38 g/10 min. |
| Recovered Sample 9-B | 42.57 g/10 min. |
| Recovered Sample 9-C | 44.18 g/10 min. |
| Recovered Sample 9-D | 46.37 g/10 min. |
| Recovered Sample 10-A | 37.44 g/10 min. |
| Recovered Sample 10-B | 38.10 g/10 min. |
| Recovered Sample 10-C | 38.09 g/10 min. |
| Recovered Sample 10-D | 37.05 g/10 min. |
| Recovered Sample 11-A | 46.18 g/10 min. |
| Recovered Sample 11-B | 44.47 g/10 min. |
| Recovered Sample 11-C | 41.63 g/10 min. |
| Recovered Sample 11-D | 44.62 g/10 min. |
| Average of Recovered Samples 9-11 | 42.09 g/10 min. |

What is claimed is:

1. A method for reclaiming a polymer from a carpet comprising the steps of:
   contacting a carpet comprising a terpene soluble polymer composition with a solvent system comprising a terpene;
   dissolving at least a portion of the polymer composition in the solvent system to provide a solution of terpene and dissolved polymer; and
   separating the terpene from the solution of terpene and dissolved polymer to provide a reclaimed polymer composition.

2. The method of claim 1, wherein the polymer is a polyolefin.

3. The method of claim 1, wherein the carpet being contacted comprises a plurality of size reduced carpet pieces.

4. The method of claim 3, wherein prior to contacting the carpet with the solvent system, a carpet is size reduced to provide the plurality of carpet pieces.

5. The method of claim 1, wherein the carpet is a tufted carpet comprising a face yarn, a primary carpet backing, and an adhesive carpet backing composition, and wherein the polyolefin polymer is present at least in the adhesive backing composition.

6. The method of claim 1, wherein the carpet comprises face yarn fibers that are not terpene soluble.

7. The method of claim 1, wherein the carpet comprises inorganic filler that is not terpene soluble.

8. The method of claim 6, wherein the solution of terpene and dissolved polyolefin further comprises the non terpene soluble face yarn fibers.

9. The method of claim 7, wherein the solution of terpene and dissolved polyolefin further comprises the non-terpene soluble inorganic filler.

10. The method of claim 1, wherein the dissolving step comprises heating the terpene solvent system to a temperature below the boiling point of the terpene.

11. The method of claim 1, wherein the terpene has the structure:

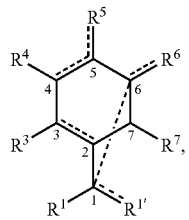

wherein
a. each ---- connotes an optional bond;
b. at least two of the optional bonds are present;
c. $R^1$, $R^{1'}$, and $R^5$ are independently selected from alkyl and carboxyl;
d. $R^3$, $R^4$, and $R^7$ are independently selected from hydrogen, hydroxyl, carbonyl, halogen, alkyl, alkoxyl, carboxyl, and acyl; and
e. $R^6$ is selected from hydrogen, hydroxyl, or oxygen.

12. The method of claim 1, wherein the terpene is obtained from citrus, pine, or a combination thereof.

13. The method of claim 11, wherein
f. $R^1$ and $R^5$ are methyl;
g. the optional bond between C1 and C2 is present and $R^{1'}$ is methylene;
h. the optional bond between C1 and C2 is present; and
i. wherein $R^3$, $R^4$, and $R^7$ are hydrogen.

14. The method of claim 11, wherein the terpene is D-limonene.

15. The method of claim 11, wherein the terpene is pinene.

16. The method of claim 15, wherein the terpene is alpha-pinene.

17. The method of claim 1, wherein the carpet comprises at least one non-terpene soluble composition, wherein the at least one non-terpene soluble composition is present in the solution of terpene and dissolved polymer, and wherein prior to separating the terpene solvent from the solution, the at least one non-terpene soluble compositions is separated from the solution.

18. The method of claim 1, wherein after separating the terpene from the solution, the separated terpene is collected for reuse in a subsequent terpene solvent system.

19. The method of claim 1, wherein the reclaimed polymer composition is dried to remove any residual terpene solvent.

20. The method of claim 1, wherein the reclaimed polymer composition comprises at least one of a HDPE, LDPE, LLDPE, ULDPE, VLDPE, VLLDPE, copolymer of ethylene and alpha olefin, polypropylene, copolymer of propylene and alpha olefin, copolymer of propylene and ethylene, EVA, and EMA.

* * * * *